United States Patent
Jiang et al.

(10) Patent No.: US 11,843,706 B1
(45) Date of Patent: Dec. 12, 2023

(54) GRADUAL CERTIFICATE ROTATION

(71) Applicant: Amazon Technologies, Inc., Seattle, WA (US)

(72) Inventors: Zhe Jiang, Kirkland, WA (US); Eugene S. Lam, Bellevue, WA (US); Emil Velichkov, Dublin (IE)

(73) Assignee: Amazon Technologies, Inc., Seattle, WA (US)

( * ) Notice: Subject to any disclaimer, the term of this patent is extended or adjusted under 35 U.S.C. 154(b) by 722 days.

(21) Appl. No.: 16/688,841

(22) Filed: Nov. 19, 2019

(51) Int. Cl.
| | |
|---|---|
| *H04L 29/06* | (2006.01) |
| *H04L 9/32* | (2006.01) |
| *H04L 9/40* | (2022.01) |
| *H04L 67/10* | (2022.01) |
| *H04L 9/08* | (2006.01) |

(52) U.S. Cl.
CPC .......... *H04L 9/3268* (2013.01); *H04L 9/0825* (2013.01); *H04L 9/3228* (2013.01); *H04L 63/166* (2013.01); *H04L 67/10* (2013.01)

(58) Field of Classification Search
CPC ... H04L 9/3268; H04L 9/0825; H04L 9/3228; H04L 63/166; H04L 67/10
See application file for complete search history.

(56) References Cited

U.S. PATENT DOCUMENTS

| | | | |
|---|---|---|---|
| 6,438,690 B1 | 8/2002 | Patel et al. | |
| 7,340,600 B1 | 3/2008 | Corella | |
| 9,507,859 B1* | 11/2016 | Roskind | ................ H04L 9/3268 |
| 10,255,445 B1 | 4/2019 | Brinskelle | |
| 10,454,689 B1* | 10/2019 | Sharifi Mehr | ........ H04L 63/166 |
| 10,715,338 B2 | 7/2020 | Walton et al. | |
| 2004/0093493 A1 | 5/2004 | Bisbee et al. | |
| 2005/0071630 A1* | 3/2005 | Thornton | ............. H04L 9/3226 713/156 |
| 2005/0114653 A1 | 5/2005 | Sudia | |
| 2006/0047950 A1* | 3/2006 | Thayer | ................ H04L 9/3268 713/156 |

(Continued)

OTHER PUBLICATIONS

Alicherry el al., "DoubleCheck: Multi-path verification against man-in-the-middle attacks" Aug. 18, 2009, Publisher: IEEE, Print ISBN:978-1-4244-4672-8, pp. 557-563. (Year: 2009).*

*Primary Examiner* — Harunur Rashid
(74) *Attorney, Agent, or Firm* — Davis Wright Tremaine LLP

(57) ABSTRACT

Techniques are disclosed to automate TLS certificate rotation. For example, a certificate rotation event may be detected from a certificate management tool. The certificate rotation event may be associated with a first certificate and may indicate that the first certificate is to be updated with a second certificate. An application server that is running on a host and to which the first certificate is bound may be identified. A certificate identifier for the second certificate may be provided to one or more agents running on the host. A distribution service may obtain certificate information, e.g., a public key, a private key, or a certificate identifier for the second certificate, from the certificate rotation tool. Some or all of the certificate information for the second certificate may be obtained by the one or more agents running on the host. The one or more agents may instruct the application server to bind the second certificate. Binding may be accomplished by the application server establishing new connections using the second certificate.

18 Claims, 12 Drawing Sheets

(56) References Cited

U.S. PATENT DOCUMENTS

| | | | |
|---|---|---|---|
| 2011/0154018 A1* | 6/2011 | Edstrom | H04L 9/3268 |
| | | | 713/151 |
| 2011/0154026 A1* | 6/2011 | Edstrom | H04L 63/166 |
| | | | 713/158 |
| 2011/0219227 A1* | 9/2011 | Sharif | H04L 63/0823 |
| | | | 713/158 |
| 2011/0252240 A1* | 10/2011 | Freedman | H04W 12/08 |
| | | | 713/169 |
| 2012/0246475 A1* | 9/2012 | Yoo | H04L 9/3268 |
| | | | 713/168 |
| 2013/0031356 A1 | 1/2013 | Prince et al. | |
| 2013/0044608 A1* | 2/2013 | Qiang | H04L 65/1045 |
| | | | 370/242 |
| 2014/0164776 A1 | 6/2014 | Hook et al. | |
| 2015/0121078 A1 | 4/2015 | Fu et al. | |
| 2016/0028729 A1 | 1/2016 | Brouk et al. | |
| 2018/0006829 A1 | 1/2018 | Kravitz et al. | |
| 2018/0060496 A1 | 3/2018 | Bulleit et al. | |
| 2019/0260599 A1 | 8/2019 | Williams et al. | |
| 2020/0136838 A1 | 4/2020 | Kucharski et al. | |
| 2020/0244468 A1 | 7/2020 | Bartok et al. | |
| 2021/0226951 A1 | 7/2021 | Goldstein et al. | |

\* cited by examiner

GRADUAL CERTIFICATE ROTATION

BACKGROUND

Some cloud computing services use clusters of servers that require transport layer security (TLS) termination be performed on host. Performing on-host TLS termination typically involves manually rotating TLS certificates for each server by operators manually restarting servers to bind new TLS certificates. As cloud computing services can utilize hundreds or thousands of servers, manual restarting servers to perform on-host TLS termination can be expensive and time consuming. Also, achieving certificate rotation at desired times can be difficult using manual binding. For example, for services that utilize the same certificate on multiple servers, it may desirable to rotate the certificates at around the same time. However, it is difficult to coordinate manual restarts across multiple servers. In addition, manually restarting servers to bind certificates can negatively affect system performance, for example, by causing existing connections to be dropped. Further, manually rotating certificates can be susceptible to operator error. For example, an operator may unintentionally bind a wrong certificate to a server. Such certificate rotation errors typically must be manually identified and rolled back, causing service owners to incur additional expenses related to operator time or service interruptions.

BRIEF DESCRIPTION OF THE DRAWINGS

Various techniques will be described with reference to the drawings, in which.

DETAILED DESCRIPTION

Figure 1:
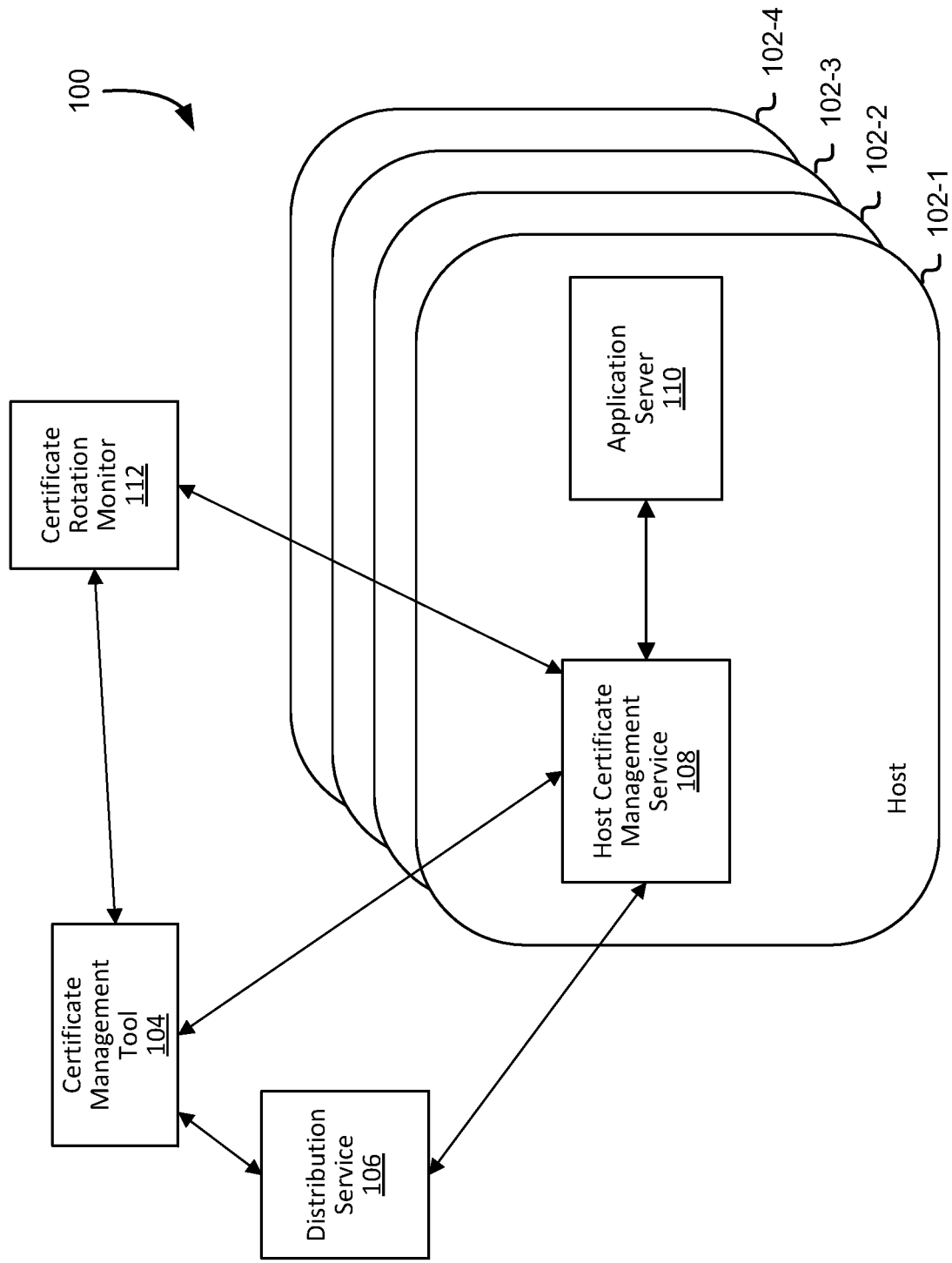
FIG. 1 shows an illustrative example of an environment in which various embodiments can be implemented.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Techniques described and suggested herein relate to certificate rotation that may be automatically performed on-host. Certificate rotation may involve binding replacement certificates to servers of hosts of a fleet. Certificate binding has traditionally been performed by operators manually restarting application servers to bind replacement certificates. Manually restarting application servers by operators can be time consuming, susceptible to errors, and costly, especially for large fleets. It can also be difficult to get certificates to bind to servers at desired times across a fleet when manual restarting servers to effectuate binding.

An automatic certificate rotation process may involve monitoring for one or more new certificates being issued as replacements for certificates that may be currently used, extracting a serial number of the new certificate as configuration information, identifying one or more application servers or hosts that use the certificate, obtaining the new certificate, deploying the new certificate to the fleet, and rotating connections of application servers running on hosts to bind the new certificate.

Monitoring for certificates changes may be performed using a centralized certificate rotation monitor service. The certificate rotation monitor service may be subscribed to updates from a certificate management tool or may otherwise detect a certificate rotation. A certificate rotation event that may identify a certificate that is to be replaced and a new certificate that is to replace the certificate. A certificate management tool may determine to replace a certificate if the certificate has expired or is expiring within a defined time period or a request to replace the certificate is received from an operator or a fleet management system.

Certificate rotation monitor service may detect a certificate rotation event, for example, by receiving a certificate rotation event from a certificate management tool. The certificate rotation event may indicate identifying information for the certificates, such as serial numbers or certificate identifiers of a certificate and a new (e.g., replacement or modified) certificate. The certificate rotation monitor service may provide an update to a dynamic configuration service indicating that a new certificate is to replace the certificate.

The dynamic configuration service may be a central service that may obtain network addresses for hosts of application servers associated with a certificate that is to be replaced. The dynamic configuration service may provide certificate configuration information for the new certificate to respective dynamic configuration agents that may be running on the hosts. For example, an application server may be associated with a certificate if the certificate is, or should be, bound to the application server. Certificate configuration information for the new certificate may indicate at least the serial number or other certificate identifier of the new certificate that is to replace a certificate.

Individual host certificate management services or other agents that may be running on respective hosts may obtain certificate configuration information for the new certificate, for example, from the dynamic configuration agent. A host certificate management service or other agent running on the host may obtain certificate information for the new certificate using a serial number or certificate identifier that may be included in the certificate configuration information. For example, host management service may query a certificate storage service (e.g., via a distribution service client) for the new certificate by providing a certificate identifier (e.g. serial number) of the new certificate to certificate storage service or distribution service that may obtain certificate information (e.g., a public or private key, expiration date) for the new certificate from the certificate management tool. For example, host certificate management service may provide certificate information (e.g., public or private key) for the new certificate to a distribution service. The distribution service may provide the certificate information for the new certificate to a distribution service agent running on the host and in communication with a host certificate management service running on the host.

Application servers may use different types of certificates. For example, a TLS termination server may use a PEM type certificate, and a Java-based application server may use a JKS keystore certificate. In order to obtain a suitable certificate for an application server, host certificate management service or other service may convert a certificate from one type of certificate management infrastructure to another. A type of certificate that is compatible with the application server may be included with certificate configuration information for the new certificate or a compatible certificate may be obtained for the application server. Host certificate management service may notify the application server to bind the new certificate, for example, based on time or date information that may be included with certificate configuration information that may be received from the dynamic configuration service. For example, the host certificate manager may notify the application server to bind to a new certificate when the new certificate is received by the application server.

Rotation to a new certificate may be accomplished gradually, for example, using host certificate management service. Active and inactive connections established with the first certificate may be maintained by the application server at a time when the application server is to bind the new certificate. The application server may establish future connections using the new certificate. Such connections established with the new certificate may serve to bind the new certificate to the application server. Inactive connections maintained by the application server and that were established with the certificate prior to a binding time of the new certificate may be ended. Active connections at the binding time that were previously established with the certificate may continue to be used by the application server after a binding time of the new certificate. For example, during a certificate rotation process, the application server may simultaneously have active connections established by the certificate and the new certificate. When a connection that was established with the certificate becomes inactive after the binding time, the connection established with the certificate may be ended or closed. When all connections established using the certificate have been ended after the binding time of the new certificate, the certificate may be terminated with respect to the application server. This gradual rotation from a certificate to a new certificate allows the application server to transition to a new certificate without the need for the application server to be restarted to bind the new certificate.

An analytics service may receive and analyze data from one or more of the application server, a dynamic configuration agent, a host certificate management service, or a certificate rotation monitor. Analytics service may analyze the received data to detect potential problems with a certificate rotation process or connections established by the application server using a certificate. If analytics service detects a problem for an application server or associated certificate, the analytics service may output a notification, for example, to a certificate rotation monitor. Subsequent to receiving the notification, certificate rotation monitor may output a notification to a service owner or trigger a roll back to a previous certificate, such as the certificate that was to be replaced by the new certificate. For example, a roll back may cause a new certificate to be replaced with the certificate or a different certificate. A roll back may be performed if a rotation has not been completed, e.g., connections maintained by the application server that were established using the certificate are still active or have not been ended and connections are also maintained by the application server that were established using the new certificate. If analytics service outputs a notification indicating a problem with an application server or its connections and a rotation to the new certificate has been completed, certificate rotation monitor may output a notification to a service owner that indicates a potential problem with the application server. The service owner may send a command to perform a roll back to the certificate or a different certificate that may be determined, for example, by a selection of the service owner.

As one skilled in the art will appreciate in light of this disclosure, certain embodiments may be capable of achieving certain advantages, including some or all of the following: providing for certificates to be automatically rotated without operator intervention to restart application servers to bind to new certificate, providing for certificates to be rotated at desired times across multiple application servers running on different hosts, reducing service downtime and interruption caused by manually restarting application servers, reducing opportunity for operator errors, reducing computing resource requirements of the fleet by reducing application server downtime caused by manual application server restarts, and providing more predictable and consistent timing regarding certificate rotation.

FIG. 1 show an illustrative example of an environment 100 in which various embodiments may be practiced. In environment 100, hosts 102-1, 102-2, 102-3, and 102-4 may form at least a portion of a fleet and may host one or more respective application servers 110 running thereon. In some embodiments, hosts 102-1, 102-2, 102-3, and 102-4 may have a respective host certificate management services 108 running thereon. Application server 110 may operate to provide applications (e.g., web applications) or an environment on which the applications may be run. Application server 110 may be associated with a certificate (e.g. a TLS certificate). The application server 110 may be associated with one or more certificates that have been bound to the application server 110. The application server 110 and a bound certificate may be used to establish connections between the application server 110 and one or more clients. It is understood that application servers, such as application server 110, may not bind a same certificate. Multiple application servers binding a certificate may be understood to involve individual application servers binding respective copies of a certificate. For example, a plurality of application servers may be running on individual hosts. Some of the application servers may use the same certificate information. For example, a layer 4 load balancer (not shown) may distribute network or application traffic to application servers, such as application server 110. It may be desirable for copies of a certificate to be bound to the application servers serviced by the load balancer.

As used herein "certificate" may include public or private certificates or keys, such as, secure socket layer (SSL) or Transport Layer Security (TLS) certificates. In some embodiments, a certificate may be associated with a protocol that may be used to establish a connection between a server and a client. As used herein, "connection" may refer to one or more associations between one or more clients and a server that define a set of parameters (e.g., security parameters) that may facilitate one or more communication channels between the server and one or more clients. For example, a connection may be established using a handshake protocol performed in accordance with a protocol, such as SSL or TLS. A connection may be established, for example, using a handshake process where two communicating sides exchange messages to acknowledge each other, verify each other, establish the encryption algorithms they will use, and agree on session keys. A secure connection may provide for one or more secure communication channels between a client and a server.

A certificate management tool 104 may track certificate expiration for a plurality of certificates that may be used by at least a portion of application servers used in environment 100. In some embodiments, certificate management tool 104 may identify one or more certificates that are to be replaced. In some embodiments, the certificate management tool 104 may obtain new certificates for the identified certificates that are to be replaced. As used herein a "new certificate" may include a certificate that has recently been issued (e.g., from a certificate authority), a different certificate, or a modified certificate that has had some certificate information changed, such as expiration date or certificate type.

In some embodiments, the certificate management tool 104 may be affiliated with a certificate authority (CA) that may issue certificates to the certificate management tool 104. The certificate management tool 104 may be in communication with a CA and may receive new certificates from the CA. For example, certificate management tool may receive a new certificate from the CA, for example, in response to sending a request to the CA for a new certificate. In some embodiments, certificate management tool 104 may identify certificates that are expired or will expire within a defined time frame. Certificate management tool 104 may obtain new certificates that are to replace the identified certificates. For example, the certificate management tool 104 may identify certificates that are expiring within a defined amount of days (e.g., five or ten) and obtain new respective certificates to replace the identified expiring certificates. The certificate management tool 104 may associate in storage a new certificate with a certificate that is to be replaced with the new certificate. The certificate management tool 104 may also store, for future monitoring, certificate information for new certificates, such as one or more of certificate source, serial number, expiration date, certificate identifier, certificate type, publication indicator, certificate chain, public or private keys, and the like. In an embodiment, the certificate management tool 104 may maintain records of certificates and replacement certificates, e.g., a certificate chain.

In an embodiment, the certificate management tool 104 may publish a certificate rotation event for a certificate when a new certificate has been associated with the certificate. The certificate rotation event may include a certificate identifier for the new certificate and a certificate identifier for the certificate that is to be replaced by the new certificate. The certificate rotation event may be obtained by a certificate rotation monitor 112. The certificate rotation monitor 112 may be a central service for at least a portion of the fleet. In an embodiment, the certificate rotation monitor 112 may subscribe to a message queue that receives certificate rotation events that are pushed from the certificate management tool 104.

In some embodiments, the certificate rotation monitor 112 may determine that the certificate to be replaced has been bound to application server 110 that is running on the host 102-1. The certificate rotation monitor 112 may determine a network address of the host 102-1 or agents running on the host 102-1, based at least in part on a certificate identifier of the certificate that is to be replaced. For example, a database may store network addresses associated with certificate identifiers, and the database may be queried for network addresses associated with the certificate identifier of the certificate that is to be replaced. In some embodiments, the network addresses may be determined by a dynamic configuration service, which may be incorporated into certificate rotation monitor 112. In some embodiments, the certificate rotation monitor 112 or other service or agent may determine a type of certificate to be used by the application server 110. In some embodiments, the type of certificate for the application server 110 and the network address of the host 102-1 may be determined using a database accessible to the certificate rotation monitor 112 or other service or agent.

The certificate rotation monitor 112 may use the obtained network addresses to send certificate configuration information, such as a certificate identifier or a type of the new certificate to an agent running on host 102-1, such as host certificate management service 108. In some embodiments, certificate information for the new certificate may be obtained based at least in part on the certificate configuration information. In an embodiment, certificate management tool 104 may provide new certificates to distribution service 106. As a result of the distribution service 106 receiving a certificate identifier for the new certificate from host certificate management service 108, distribution service 106 may provide certificate information for the new certificate to host certificate management service 108. In some embodiments, certificate information for the new certificate may be obtained by the host certificate management service 108 from the certificate management tool 104 or storage connected to the certificate management tool 104. In an embodiment, the new certificate may be pushed by distribution service 106 to a distribution service agent that is running on host 102-1, and host certificate management service 108 may receive the new certificate from the distribution service agent. In some embodiments, the host certificate management service 108 may cause a new certificate to be modified to a type that is compatible with the application server 110. In some embodiments, host certificate management service 108 may obtain the new certificate in a type that is compatible with the application server 110. Once the host certificate management service has obtained a suitable type of the new certificate for the application server 110, host certificate management service 108 may instruct the application server 110 to bind the new certificate. In some embodiments, host certificate management service 108 may control connections between the application server 110 and one or more clients that were established using the certificate that is to be replaced by the new certificate. In some embodiments, the application server 110 may transition gradually from the certificate to the new certificate. For example, application server 110 may maintain, in an overlapping time period, connections established using two different certificates (e.g., the certificate and the new certificate). In some embodiments, environment 100 may allow the new certificate to replace certificates at multiple application servers at a particular time. In some embodiments, environment 100 may allow certificate rotations to be automatically performed repeatedly on individual application servers. For example, environment 100 may allow for multiple certificate rotations to be performed on application server 110. A record identifying a sequence of certificates associated with application server 110, for example, may be maintained.

In some embodiments, a potential problem with the certificate rotation may be detected. In such embodiments, certificate rotation monitor 112 may trigger a roll back of the new certificate to a different certificate. In some embodiments, the different certificate may be a certificate that was previously used by the application server 110. For example, the different certificate may be the certificate that was to be replaced with the new certificate. In some embodiments, a potential problem with a certificate used by the application server 110 may be detected as a result of a certificate rotation monitor receiving a notification from an analytics service. The analytics service may analyze data related to certificate rotation or related connections to determine potential problems pertaining to connections or certificate rotation. In some embodiments, analytics service may identify a potential problem by analyzing metrics related to certificate performance that may be provided by, for example, host certificate management service 108, application server 110, or certificate rotation monitor 112. For example, an analytics service may output a notification to certificate rotation monitor 112 if a TLS alert metric rate exceeds by a predetermined amount (e.g., greater than 10%, 20%, 25%) an average value for the TLS alert metric over a time period. In some embodiments, certificate rotation monitor 112 may output an alert to a service owner in response to receiving a notification of a problem with a certificate used by the application server 110 from analytics service. In an embodiment, a roll back to a certificate previously used by the application server 110 may be initiated by certificate rotation monitor 112 if rotation of the new certificate to the application server 110 has not been completed at a time of the notification. Rotation to a new certificate may be completed if connections at the application server 110 established using the certificate are active. In some embodiments, if rotation of a new certificate to the application server 110 has been completed at a time that a first notification has been output by analytics service, then a second notification of a potential problem may be sent by the certificate rotation monitor 112 to a service owner. The service owner may select to initiate a roll back. For example, the service owner may select to roll back the new certificate to the certificate that was to be replaced by the new certificate. In some embodiments, a rotation from a certificate to a new certificate may be complete with respect to application server 110 when connections established using the certificate have been ended and all connections currently maintained by the application server 110 have been established using the new certificate.

Figure 2:
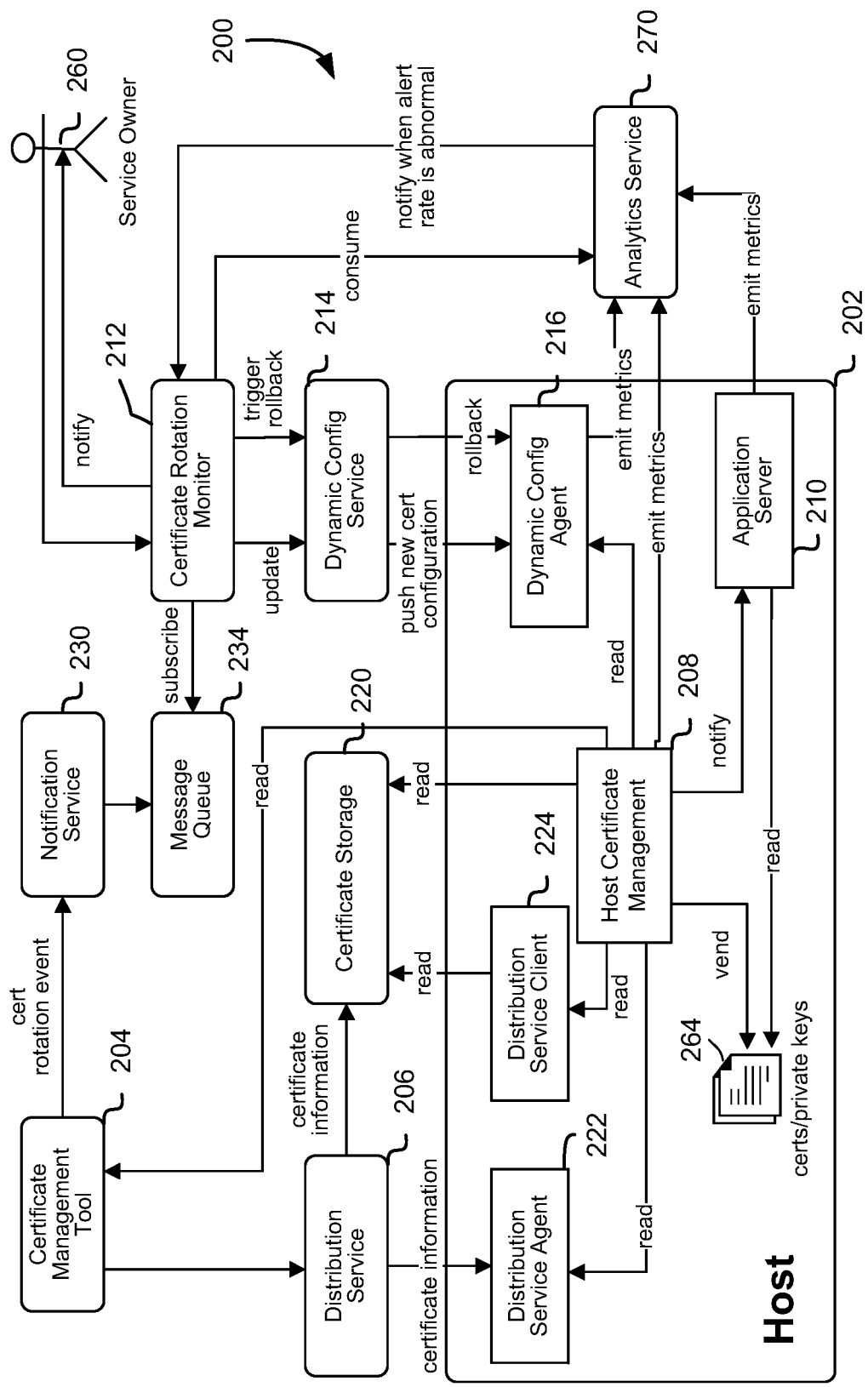
FIG. 2 shows another illustrative example of an environment in which certificate rotation may be performed automatically in accordance with one or more embodiments.

FIG. 2 shows an illustrative example of an environment 200 in which various embodiments may be implemented. Environment 200 may enable automatic certificate rotation on one or more application servers 210 of a host 202 on which other components (e.g., agents or daemons) may be running. Host 202 may be part of a fleet of hosts and may include, a server computer system (such as described below) or a distributed computer system comprising multiple computer systems, each with one or more processors and memory that stores instructions executable by the one or more processors to perform at least some of the operations described herein. For example, application server 210 may be a virtual machine. The application server 210 may communicate with one or more clients over a connection that may be established using the certificate 264. In some embodiments, the certificate 264 may be a TLS certificate. In some embodiments, traffic, for example network or application traffic, may be distributed via a load balancer (not shown) to a fleet of hosts, such as host 202, and application servers, such as application server 210.

Certificate management tool 204 may track a plurality of certificates, such as certificate 264, and may obtain new certificates for the tracked certificates. New certificates may be obtained automatically or in response to requests to replace the certificate that may be received from, for example, a service owner 260. In some embodiments, certificate management tool 204 may obtain a new certificate for application server 210 as a result of service owner 260 sending a request to rotate or replace the certificate 264. For example, service owner 260, may be a customer of a cloud computing service provider network, which may provide host 202 and application server 210 as part of a cloud computing service. In some embodiments, certificate management tool 204 may track expiration dates for certificates. Certificate management tool 204 may obtain new certificates as a result of identifying certificates that are expired or expiring within a time period. Certificate management tool 204 may be, for example, a server computer system (such as described below) or a distributed computer system comprising multiple computer systems, each with one or more processors and memory that stores instructions executable by the one or more processors to perform at least some of the operations described herein. In some embodiments, certificate management tool 204 may be a central service that tracks certificates used by multiple fleets.

In some embodiments, certificate management tool 204 may obtain new certificates from a CA. For example, as a result of determining that certificate 264 should be replaced, certificate management tool 204 may communicate with a CA to obtain a new certificate. The certificate management tool may maintain in storage records indicating certificates and new certificates that are to replace the certificates.

In some embodiments, certificate management tool 204 may provide certificate information for the new certificate to one or more agents running on the host 202. For example, certificate management tool 204 may provide certificate information for the new certificate to distribution service 206, which may provide the certificate information to host certificate management service 208 via distribution service agent 222. Distribution service agent 222 may be, for example, an agent that is running on host 202. Distribution service 206 may be implemented on a server computer system (such as described below) or a distributed computer system comprising multiple computer systems, each with one or more processors and memory that may store instructions executable by the one or more processors to perform at least some of the operations described herein.

Distribution service 206 may store certificate information for the new certificate in certificate storage 220, and host certificate management 208 may obtain certificate information for the new certificate from certificate storage 220. For example, host certificate management may read certificate information from certificate storage 220 for a certificate identifier (e.g., serial number). Certificate storage 220 may be implemented, for example, using various types of storage, such as described below with respect to FIG. 12.

Certificate information for a certificate, such as certificate 264, may include some or all of the following: the certificate, corresponding public or private key, a serial number, a certificate ID, an indication of a time or date that the certificate is to expire, an identifier of one or more prior certificates that the certificate is to replace, and the like. In some embodiments, distribution service client 224 may obtain certificate information for new certificate from certificate storage 220. Distribution service client 224 may be an application running on the host 202. In some embodiments, distribution service agent 222 may obtain certificate information for the new certificate from the distribution service 206. The distribution service agent 222 may be, for example, a daemon or agent running on host 202.

In one or more embodiments, certificate management tool 204 may provide a certificate rotation event that may indicate a certificate that is to be replaced. In some embodiments the certificate rotation event may identify a certificate that is to be replaced and a corresponding new certificate that is to replace the certificate. For example, certificate management tool 204 may determine that certificate 264 should be replaced because it has expired, its expiration date is approaching, or its expiration date is within a defined time frame. In another example, the certificate management tool 204 may output a certificate rotation event pertaining to certificate 264 as a result of service owner 260 sending a request for certificate rotation on the application server 210. Certificate management tool 204 may then obtain a new certificate, for example, from a CA and push a certificate rotation event that indicates, for example, that certificate 264 is to be replaced by the new certificate. The certificate rotation event may be received by certificate rotation monitor 212 or dynamic configuration service 214.

In some embodiments, certificate management tool 204 may push certificate rotation events to notification service 230, which may add the certificate rotation event to message queue 234. For example, message queue 234 may provide a buffer that stores messages and endpoints to allow software components to connect to the queue 234 in order to send and receive messages. Message queue 234 may allow different parts of a system, such as certificate management tool 204 and certificate rotation monitor 212, to communicate asynchronously. Notification service 230 or the message queue 234 may be implemented on a server computer system or a distributed computer system comprising multiple computer systems, each with one or more processors and memory that stores instructions executable by the one or more processors to perform at least some of the operations described herein. Certificate management tool 204 and notification service 230 may be provided by a single entity or different entities.

In some embodiments, a certificate rotation event may include one or more certificate numbers, certificate identifiers, or serial numbers for certificate 264 or a new certificate that is to replace certificate 264. In an embodiment, a certificate rotation event may include the serial number of certificate 264 and the serial number of a new certificate that is to replace certificate 264. In some embodiments, a certificate rotation event may include an identifier of a certificate that is to be replaced. In such embodiments, a new certificate that is to replace to the certificate may be obtained by sending the identifier to a service that maintains the certificates and replacement certificates. The service may return the new certificate in response to the certificate being provided. In some embodiments, a certificate rotation event may include an indication of an urgency of certificate replacement. For example, a certificate rotation event may include an expiration date or a date of an operation (e.g., renewed, modified, or published) for the certificate 264.

Table 1 shows example certificate rotation event data pertaining to a certificate used in the environment 200, such as certificate 264. Such information may be used by certificate rotation monitor 212 or certificate management tool 204 to initiate a certificate rotation.

TABLE 1

| Name | Type | Description |
| --- | --- | --- |
| Certificate Id | Integer | Certificate id |
| CN | String | Common name of the certificate |
| Serial Number | String | Serial number of the certificate |
| Expiry Date | Date | Expiration date of the certificate |
| Operation | Enum | The operation of the certificate. Renewed/Modified/Published etc. |
| Is Published | Boolean | Value indicating whether the certificate has been published |
| Certificate Chain | Text<0... n> | Certificate chain, e.g., in base64 encoding |
| Private Key | Text | Private key, e.g., in base64 encoding |

Certificate rotation monitor 212 may monitor certificates for renewal or replacement. If the certificate rotation monitor determines that certificate 264 is to be replaced with a new certificate, certificate rotation monitor 212 may cause host 202 to be notified that certificate 264 should be updated to a new certificate. Certificate rotation monitor 212 may be implemented, for example, using a server computer system (such as described below) or a distributed computer system comprising multiple computer systems, each with one or more processors and memory that stores instructions executable by the one or more processors to perform at least some of the operations described herein. In some embodiments, certificate rotation monitor 212 may monitor some or all certificates utilized by a fleet. In some embodiments, certificate rotation monitor 212 may determine that certificate 264 is to be replaced by subscribing to certificate rotation events for the certificate 264. Such certificate rotation events may be pushed by the certificate management tool 204. In some embodiments, the certificate rotation monitor 212 may determine application servers or hosts that are associated with a certificate that is subject to a certificate rotation event and provide an update, for example, to dynamic configuration service 214. The update may indicate a new certificate that is to replace a certificate. Application server 210 may be associated with a certificate that is subject to a certificate rotation event if the certificate is bound to application server 210.

Dynamic configuration service 214 may service one or more fleets of hosts and may include, a server computer system (such as described below) or a distributed computer system comprising multiple computer systems, each with one or more processors and memory that stores instructions executable by the one or more processors to perform at least some of the operations described herein. Dynamic configuration service 214 may use the update from the certificate rotation monitor 212 to determine certificate configuration information to be provided to the host 202 on which the application server 210 is running. Certificate configuration information may indicate an identification of a new certificate to be bound to application server 210. In some embodiments, certificate configuration information may indicate a type of the new certificate that is compatible with the application server 210. In one or more embodiments, dynamic configuration service 214 may maintain network addresses for hosts, such as host 202, serviced by dynamic configuration monitor 214. Dynamic configuration service 214 may identify one or more network addresses associated with hosts on which application servers are running that use the certificate that is to be replaced. In some embodiments, dynamic configuration service 214 may provide certificate configuration information for the new certificate to an agent of the host 202, such as the dynamic configuration agent 216 or a host certificate management service 208.

In some embodiments, dynamic configuration service 214 may maintain information that indicates types of certificates that are to be used by individual application servers of the fleet. Dynamic configuration service 214 may maintain information that indicates hosts, such as host 202, or application servers, such as application server 210, and corresponding certificate identifiers (e.g., serial numbers) that are used by the host 202 or application server 210. Dynamic configuration service may incorporate such information into certificate configuration information that may be provided to host 202.

In one or more embodiments, dynamic configuration service 214 may determine, based on an identification of a certificate that is to be replaced, an address of the host 202, an address of an agent running on the host 202, or an address of the application server 210. In one or more embodiments, based on an identification of the certificate to be replaced, the dynamic configuration service 214, may determine a type of certificate that is compatible with the application server 210. The dynamic configuration service 214 may provide (e.g., push) certificate configuration information for the new certificate to a dynamic configuration agent 216, which may be an agent running on the host 202. The certificate configuration information for the new certificate may include a certificate identifier for the new certificate or the certificate that is to be replaced, an indication of the application server 210, such as a network address of the application server 210 or an identifier for the application server 210, or a type of certificate that is compatible with application server 210. In some embodiments, certificate configuration information may include a time parameter that may indicate when certificate 264 should be rotated, e.g., when certificate 264 should be replaced with new certificate. The time parameter may allow multiple application servers to synchronize binding to the new certificate at a time corresponding to the time parameter. For example, certificate configuration information, such as the time parameter, may be pushed to multiple hosts that have application servers that have bound the certificate to be replaced. The hosts may initiate rotation to a new certificate at the time indicated by the time parameter.

TABLE 2

| Name | Type | Description |
|---|---|---|
| Certificate Id | Integer | The certificate Id |
| Certificate Source | Enum | From where to get the certificate and private key |
| Certificate Retrieve Retry Count | Integer | The total count for the Host Certificate Management tool retry to retriever the certificate |

Table 2 shows example data that may be utilized, for example, by the dynamic configuration service 214 or dynamic configuration service agent 216. In some embodiments, such data may be included in certificate configuration information that may be provided to the host 202. In some embodiments, certificate configuration information may be consumed by a configuration parser of the host certificate management service 208. For example, the configuration parser may be used to obtain a certificate identifier and a type of certificate from the certificate configuration information. In some embodiments, certificate configuration information may further include an indication of a certificate chain or a private key for the certificate. The certificate configuration information may be read by host certificate management service 208, for example, via dynamic configuration agent 216. In some embodiments, a serial number or certificate identifier for the new certificate may be indicated in the certificate configuration information. In some embodiments, the serial number for the new certificate may be used by host certificate management service 208 to obtain certificate information for the new certificate. In some embodiments where a certificate is to be rolled back, the certificate configuration information may indicate a previous certificate and a current certificate. In some embodiments, the certificate configuration information may identify the certificate to be replaced. In such embodiments, a service (e.g., a distribution service) may be queried with the identity of the certificate to be replaced to obtain certificate information for the new certificate.

Host certificate management service 208 may be an application running on the host 202 that may manage certificate rotation of application servers, such as application server 210, running on the host 202. For example, host certificate management service 208 may obtain certificate configuration information from dynamic configuration service 214. Host certificate management service 208 may use at least a portion of certificate configuration information from dynamic configuration service 214 to obtain certificate information for the new certificate from certificate storage 220, distribution service 206, or certificate management tool 204. Host certificate management service 208 may cause application server 210 to rotate certificates from a current certificate, such as certificate 264, to a new certificate. In some embodiments, host certificate management service 208 may cause an automatic rotation in the application server 210 from a certificate, such as certificate 264, to a new certificate that is to replace the certificate. In some embodiments, certificate management service 208 may cause the application server 210 to gradually rotate from a certificate to a new certificate without requiring a restart of the application server 210 to bind the new certificate. In some embodiments, certificate management service 208 may change (e.g., convert) a certificate to a type that is compatible with the application server 210. In some embodiments, certificate management service 208 may obtain a certificate in a format type that is compatible with the application server 210. For example, certificate management service 208 may obtain information about a type of certificate that is compatible with the application server 210 from certificate configuration information that may be provided by dynamic configuration service 214.

In one or more embodiments, an analytics service 270 may monitor and assess a performance of application server 210. Analytics service 270 may service one or more fleets of hosts and may include, a server computer system (such as described below) or a distributed computer system comprising multiple computer systems, each with one or more processors and memory that stores instructions executable by the one or more processors to perform at least some of the operations described herein. For example, analytics service 270 may monitor an amount of established connections or an amount dropped connections for a given time period and compare to expected, e.g. average, values for the application server 210 or some or all of the application servers in the fleet.

In some embodiments, one or more of certificate rotation monitor 212, application server 210, host certificate management 208, or dynamic configuration agent 216 may provide data or metrics to analytics service 270. Analytics service 270 may use some or all of such data to identify potential problems related to the certificate 264 or binding of the new certificate by application server 210. In some embodiments, if a potential problem with certificate 264 or a binding of certificate 264 to application server 210 is identified by analytics service 270, application server 210 may record TLS telemetry information as a service log or provide TLS telemetry information to the analytics service 270 for further analysis or storage. In an embodiment, analytics service 270 may determine that a rate of certificate rotation is not normal, and the analytics service 270 may send an alarm to certificate rotation monitor 212. Certificate rotation monitor 212 may consume the alarm and may initiate a roll back of the certificate deployment or provide a notification to service owner 260. For example, analytics service 270 may provide a notification to certificate rotation monitor 212 if monitored performance metrics for the application server 210 exceed or fall below a threshold, e.g., +/-10% or 20% of expected values.

In some embodiments, certificate rotation monitor 212 or other service may determine if a deployment of a new certificate to the application server 210 has been completed. Certificate rotation refers to transitioning a server from binding a certificate to binding a different certificate. In some embodiments, a deployment by application server 210 from certificate 264 to a new certificate may be accomplished by a gradual transition from certificate 264 to the new certificate. For example, at a bind time, application server 210 may bind new certificate by establishing new connections with one or more clients using the new certificate. In some embodiments, connections that are active at a bind time and that were established using a certificate that the application server 210 was bound to at or prior to the bind time may remain in use after the bind time. In such embodiments, the application server 210 may simultaneously maintain connections established using different certificates. Maintaining connections of the application server 210 that were established with different certificates may be accomplished using an application that may reload a certificate configuration and fork a new worker on application server 210 to service future requests using a new certificate. Certificate and connection configuration information for application server 210 can be stored in memory or in a file in storage. Storing certificate and connection configuration information in storage may allow certificate and connection configuration information for the application server 210 to persist across restarts of the application server 210.

A rotation by application server 210 from certificate 264 to a new certificate may be complete when current connections maintained by application server 210 have been established using the new certificate. For example, rotation from certificate 264 to a new certificate by application server 210 may be complete when connections established with certificate 264 are closed and current connections serviced by the application server 210 have been established with the new certificate. If application server 210 is currently maintaining connections established with the certificate 264 and the new certificate, then deployment to the new certificate may be determined to be partially complete. In some embodiments, if deployment to the new certificate is complete and a potential problem with the new certificate or application server 210 is detected, certificate rotation monitor 212 may output an alarm to service owner 260 via a message. The message may indicate that there may be a problem with the application server 210 or a certificate associated with the application server 210. In some embodiments, if deployment of a new certificate by the application server 210 is partially complete, then certificate rotation monitor 212 may output a notification to a dynamic configuration service 214 to cause a roll back of the new certificate to certificate 264 or a previous certificate. In such embodiments, a roll back to certificate 264 or a different certificate may be triggered automatically without requiring an input from the service owner 260 or an operator.

In some embodiments, where a deployment from certificate 264 to new certificate by application server 210 is partially complete and a roll back has been triggered, for example, due to a problem being detected with a connection established with a new certificate, application server 210 may establish new connections after a roll back time using certificate 264. In such embodiments, some or all connections that were established by application server 210 with the new certificate may be ended. For example, in a roll back from a new certificate to the certificate 264, connections established by the new certificate may be ended if such connections are determined to be inactive. In one or more embodiments, inactivity of a connection may be determined based on an amount of data that is being communicated in the connection to or from the application server 210. For example, if an amount of data communicated between application server 210 and a client does not meet a threshold amount of data or a threshold data rate, then the connection may be determined to be inactive and may be ended or closed. In some embodiments, where rotation to a new certificate from certificate 264 on application server 210 has been completed, a roll back may involve obtaining a previously used certificate, such as certificate 264, for example, from the distribution service 206. In one or more embodiments, certificate rotation monitor 212 may identify a previously used certificate that has not expired and provide configuration information for the previously used certificate to host certificate management service 208, which may obtain certificate information for the previously used certificate. In an embodiment, certificate information for a previously used certificate may be retrieved from distribution service 206.

Figure 3:
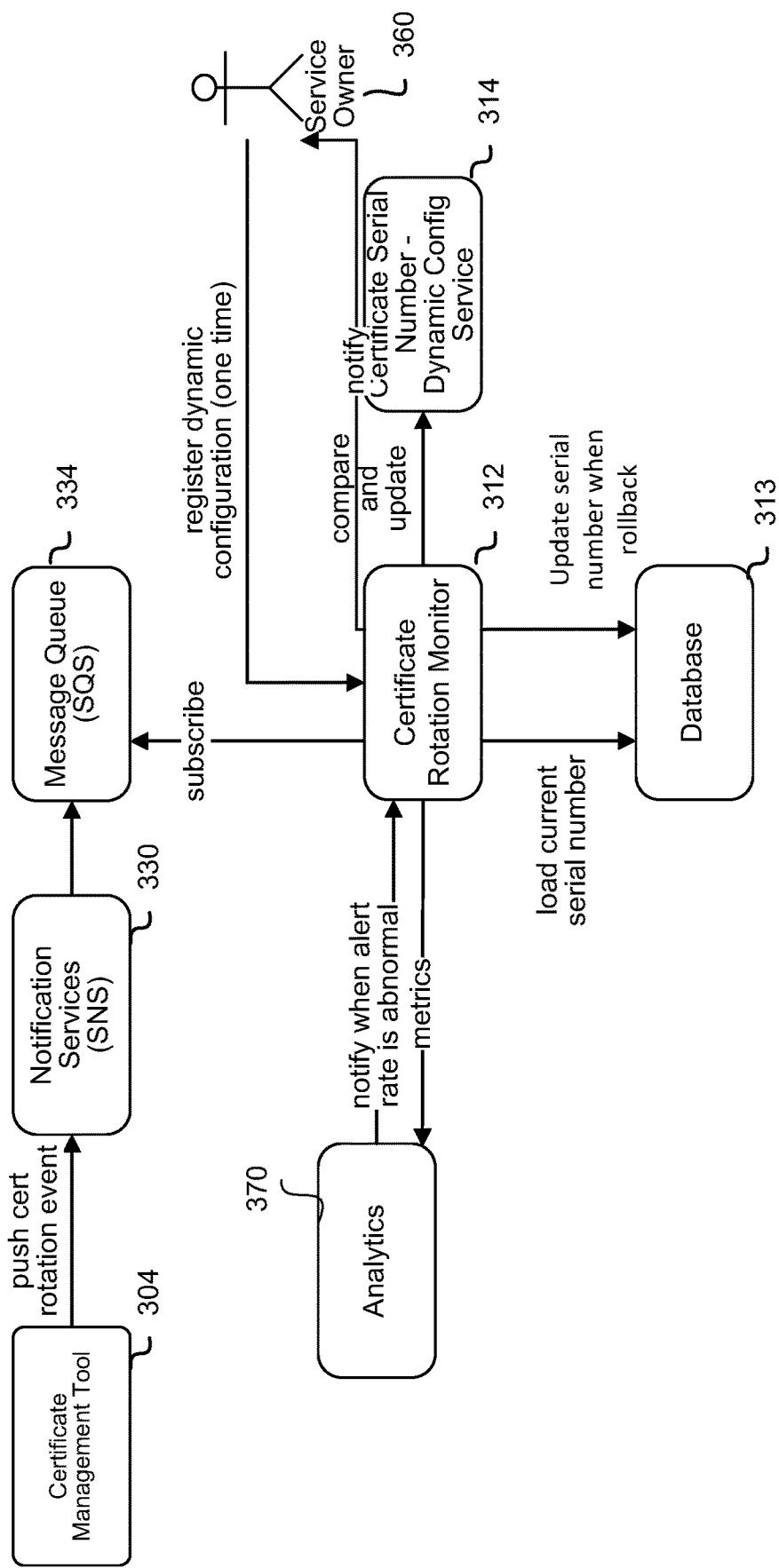
FIG. 3 shows an illustrative example of a certificate rotation monitor in which a certification rotation event is pushed to a message queue that is subscribed to by the certificate rotation monitor in accordance with one or more embodiments.

FIG. 3 shows an illustrative example of a certificate rotation monitor 312 that may trigger certificate rotation or trigger certificate roll back in one or more application servers. In some embodiments, when a certificate is renewed, certificate management tool 304 may send a notification as a certificate rotation event to a message queue 334 via a notification service 330. Certificate rotation monitor 312 may be subscribed to the message queue 334. In some embodiments, as a result of detecting a new certificate rotation event, certificate rotation monitor 312 may obtain a certificate identifier (e.g., serial number) from a database 313, compare whether the serial number in the database 313 is the same as a serial number that is stored at a dynamic configuration service 314, and if so, cause an update at the dynamic configuration service 314 with the new serial number such that the new serial number is stored in the database 313. In some embodiments, if the current serial number in database 313 is not the same as in the dynamic configuration service 314, then the certificate rotation monitor 312 may send a notification to service owner 360. For example, the serial number in database 313 may not match the serial number stored by the dynamic configuration service 314 if, for example, a service owner 360 has triggered a certificate deployment, for example, by sending a request for certificate rotation. A confirmation may be received from service owner 360 to proceed with rotating an application server to the certificate indicated by dynamic configuration service 314, and database 313 may be updated to indicate the serial number stored by dynamic configuration service 314 for the application server.

In some embodiments, a certificate rotation that has been performed or is in the process of being performed may be rolled back using certificate rotation monitor 312. Rolling back a certificate on one or more application servers may involve rotating to a previous certificate or undoing a partial rotation from a certificate to a new certificate. In one or more embodiments involving an under-deployment (e.g., partially completed) roll back case, an analytics service 370 may trigger an alarm, which may be output to certificate rotation monitor 312. For example, analytics service 370 may determine to trigger an alarm if an average TLS certificate alert metrics rate is higher or lower than normal (e.g., 10 percent). In some embodiments, if an alarm is received from analytics service 370, the certificate rotation monitor 312 may automatically stop a deployment of a new certificate to the application server and roll the application server back to a different certificate. In some embodiments, the different certificate may be the certificate that was to be replaced by a new certificate. For example, where rotation from a certificate to a new certificate has been completed, the certificate rotation monitor 312 or analytics service 370 may consume and analyze a certificate fingerprint metric indicating performance of the new certificate. If the certificate fingerprint metric is not consistent with an expected fingerprint metric or falls outside of a threshold or a range, the certificate rotation monitor 312 may send a notification to the service owner 360. The service owner 360 may send a confirmation to proceed with a roll back, for example, to certificate rotation monitor 312. If a roll back is determined or confirmed, for example, by a service owner 360, the certificate rotation monitor 312 may update database 313 and dynamic configuration service 314 to indicate a certificate that is to be deployed in the roll back. A roll back to the indicated certificate may then be implemented, for example, by the application server binding the indicated certificate.

Figure 4:
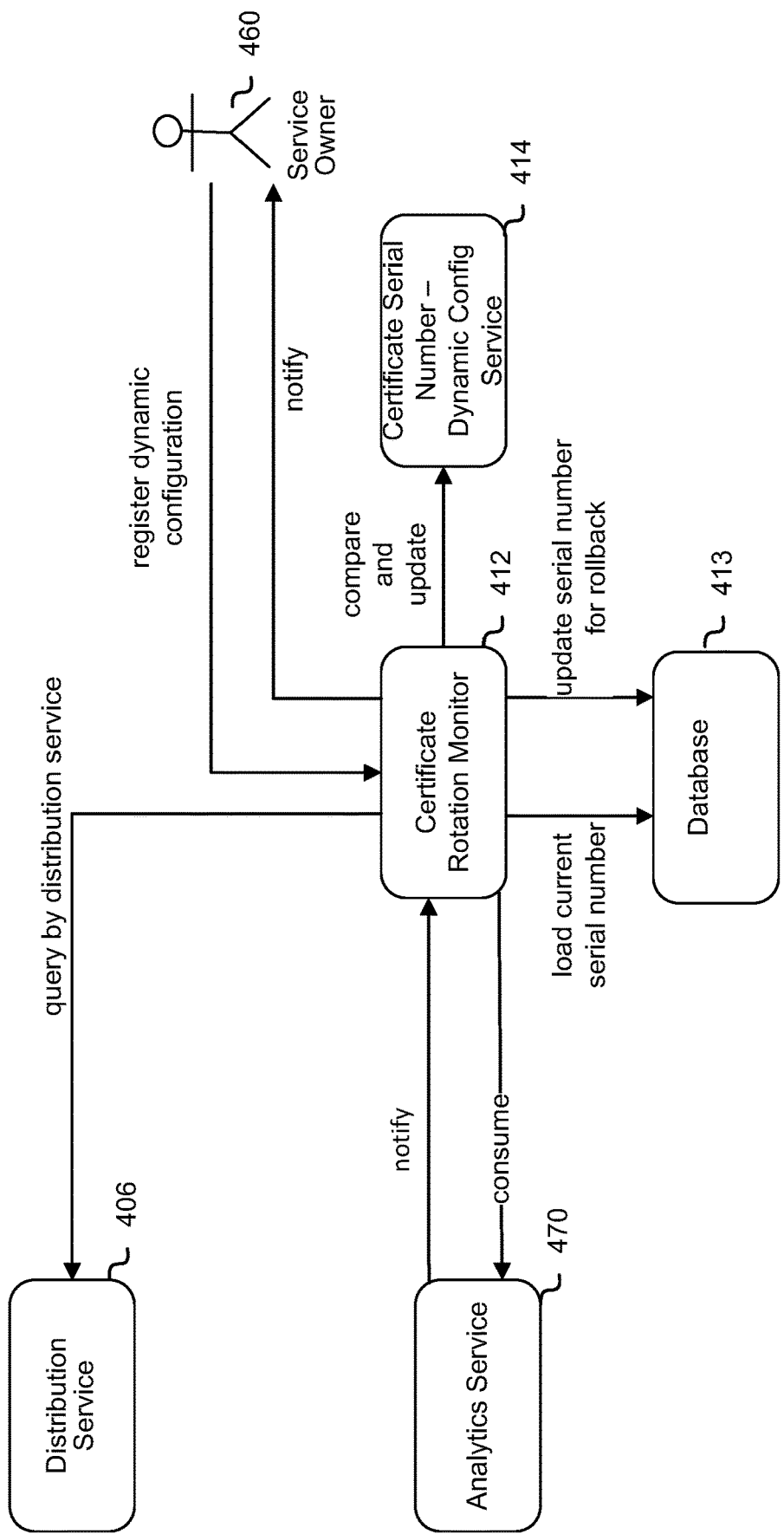
FIG. 4. shows illustrative example of a certificate rotation monitor implementation in which a certificate rotation event is detected by the certificate rotation monitor querying a certificate management tool in accordance with one or more embodiments.

FIG. 4 illustrates an example of a certificate rotation monitor 412 that may determine a certificate rotation event by querying a certificate management tool or a service connected to a certificate management tool, such as a distribution service 406. In some embodiments, certificate rotation monitor 412 may track certificates used by particular application servers or hosts. Certificate rotation monitor 412 may send queries to distribution service 406 or one or more other services that may maintain certificate rotation event for some or all of the tracked certificates. For example, certificate rotation monitor 412 may send, to distribution service 406, a certificate identifier for a certificate that has been bound to an application server monitored by certificate rotation monitor 412 to check for certificate rotation events involving the certificate. If distribution service 406 returns information indicating that a certificate should be updated with a new certificate, certificate rotation monitor 412 may update database 413 and dynamic configuration service 414 with a certificate identifier for the new certificate. If distribution service 406 indicates that a queried certificate is not to be changed, then certificate rotation monitor 412 may make no changes to database 413 or indicate that the certificate was checked for updates. In some embodiments, certificate rotation monitor 412 may send queries periodically, e.g., hourly, daily, weekly, etc., for some or all certificates associated with application servers or hosts monitored by the certificate rotation monitor 412. In some embodiments, service owner 460 may request a certificate rotation for an application server, and database 413, and dynamic configuration service 414 may be automatically updated to indicate a new certificate for the application server. In some embodiments, service owner 460 may confirm that a certificate is to be replaced prior to database 413 and dynamic configuration service 414 being updated to indicate that the certificate is to be replaced.

If certificate rotation monitor 412 determines a certificate roll back should be performed, database 413 or dynamic configuration service 414 may be updated to reflect at least a certificate that is to be deployed by the roll back. In some embodiments, a roll back may be determined as a result of analytics service 470 identifying a potential problem with a connection established using a certificate bound to the application server. In some embodiments, a roll back may be determined if a service owner sends a request for a roll back. Such a request may be received by certificate rotation monitor 412, which may output a certificate rotation event, for example, to dynamic configuration service 414. In some embodiments, dynamic configuration service 414 may trigger a roll back by sending certificate configuration information to a host on which an application server is running that is subject to the roll back. For example, the certificate configuration information may indicate an identifier for the certificate that is to be deployed in a roll back.

Figure 5:
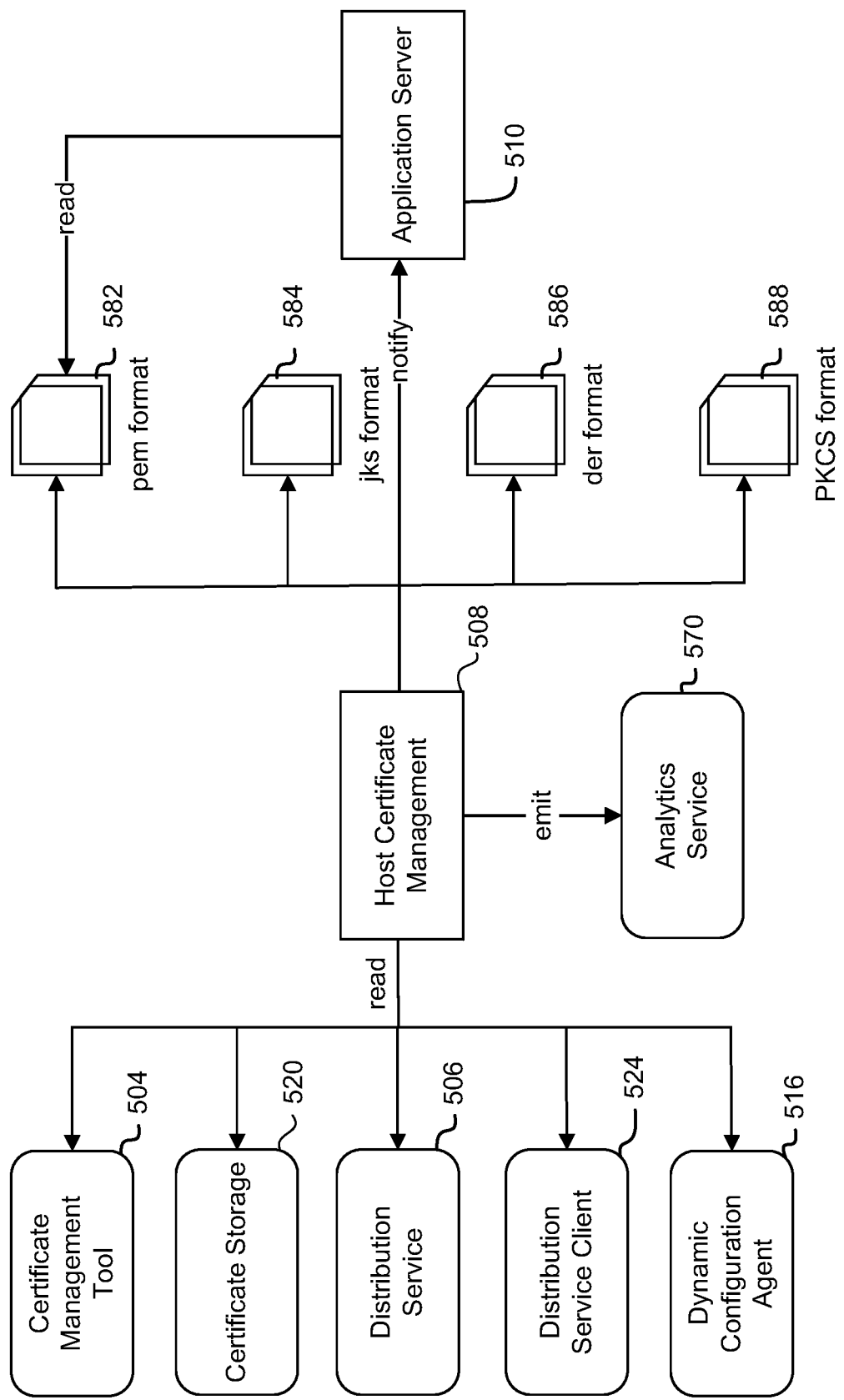
FIG. 5 shows an illustrative example of a host certificate management service in accordance with one or more example embodiments in the present disclosure.

FIG. 5 illustrates an illustrative example of a host certificate management service 508. In some embodiments, host certificate management service 508, may communicate with the certificate management tool 504, certificate storage 520, distribution service 506, distribution service client 524, or dynamic configuration agent 516. In some embodiments, host certificate management service 508 may be an agent (e.g., an application) that may be running on a host on which an application server 510 with a certificate to be rotated may be running. In some embodiments, host certificate management service 508 may obtain certificate information for a new certificate that is to replace a certificate associated with application server 510 from distribution service 506 or distribution service client 524. In some embodiments, host certificate management service 508 may obtain certificate information from certificate storage 520 for the new certificate. In some embodiments, dynamic configuration agent 516 may provide configuration information for the new certificate, such as serial number or type of certificate, to host certificate management service 508. In some embodiments, host certificate management service 508 may use configuration information to obtain certificate information for a new certificate.

Analytics service 570 may be a service that may analyze logs or other data from, for example, host certificate management service 508. In some embodiments, host certificate management service 508 may output data indicative of one or more times that a certificate rotation began or ended with respect to application server 510. In some embodiments, host certificate management service 508 may output a current amount of connections established using particular certificates associated with the application server 510. In some embodiments, host certificate management service 508 may provide one or more data transfer rates or an amount of dropped connections associated with application server 510 that has been bound to a particular certificate. Analytics service 570 may use such information to identify a potential problem with application server 510 or a certificate, which has been bound to the application server 510. If analytics service 570 detects a potential problem, an alarm or notification may be output. In some implementations, the alarm or notification may trigger a roll back or cause an alert to be sent to a service owner.

In some embodiments, certificates 582, 584, 586, and 588 may be certificates in different certificate format types, such as pem, jks, der, or PKCS. Certificates 582, 584, 586, or 588 may be stored in storage accessible to host certificate management service 508 or application server 510. In some embodiments, some or all of certificates 582, 584, 586, and 588 may be different implementations (e.g., formats) of a single certificate. In some embodiments, one or more of certificates 582, 584, 586, or 588 may be obtained from certificate storage 520, distribution service 506, or distribution service client 524 in response to host certificate management service 508 obtaining a notification to obtain a certificate in a particular certificate format type. In some embodiments, host certificate management 508 may obtain a certificate in a format type and convert the certificate to one or more different formats, such as one or more of the formats of certificates 582, 584, 586, or 588. In some embodiments, an indication of a format type that is compatible with application server 510 may be obtained from dynamic configuration agent 516. In some embodiments, a compatible certificate format type for application server 510 may be determined by host certificate management service 508, for example based on certificate configuration information. In some embodiments, host certificate management service 508 may obtain a certificate in a compatible certificate format type or cause a certificate to be converted into a compatible certificate format type. In some embodiments, host certificate management service 508 may retrieve one of certificates 582, 584, 586, or 588 based on a type of certificate specified in a notification from dynamic configuration agent 516. In some embodiments, host certificate management service 508 may obtain one of certificates 582, 584, 586, or 588, determine that the certificate format type of the obtained certificate is not compatible with application server 510, cause the obtained certificate to be converted to a certificate format type that is compatible with application server 510, and cause the application server 510 to bind the certificate in the compatible certificate format type. In some embodiments, host certificate management service 508 may provide instructions to application server 510 to bind a particular one of the certificates 582, 584, 586, or 588 in order to accomplish at least a part of a certificate rotation. For example, host certificate management service 508 may determine that application server 510 is compatible with certificate 582. Host management service 508 may then instruct the application server 510 to bind certificate 582.

Figure 6:
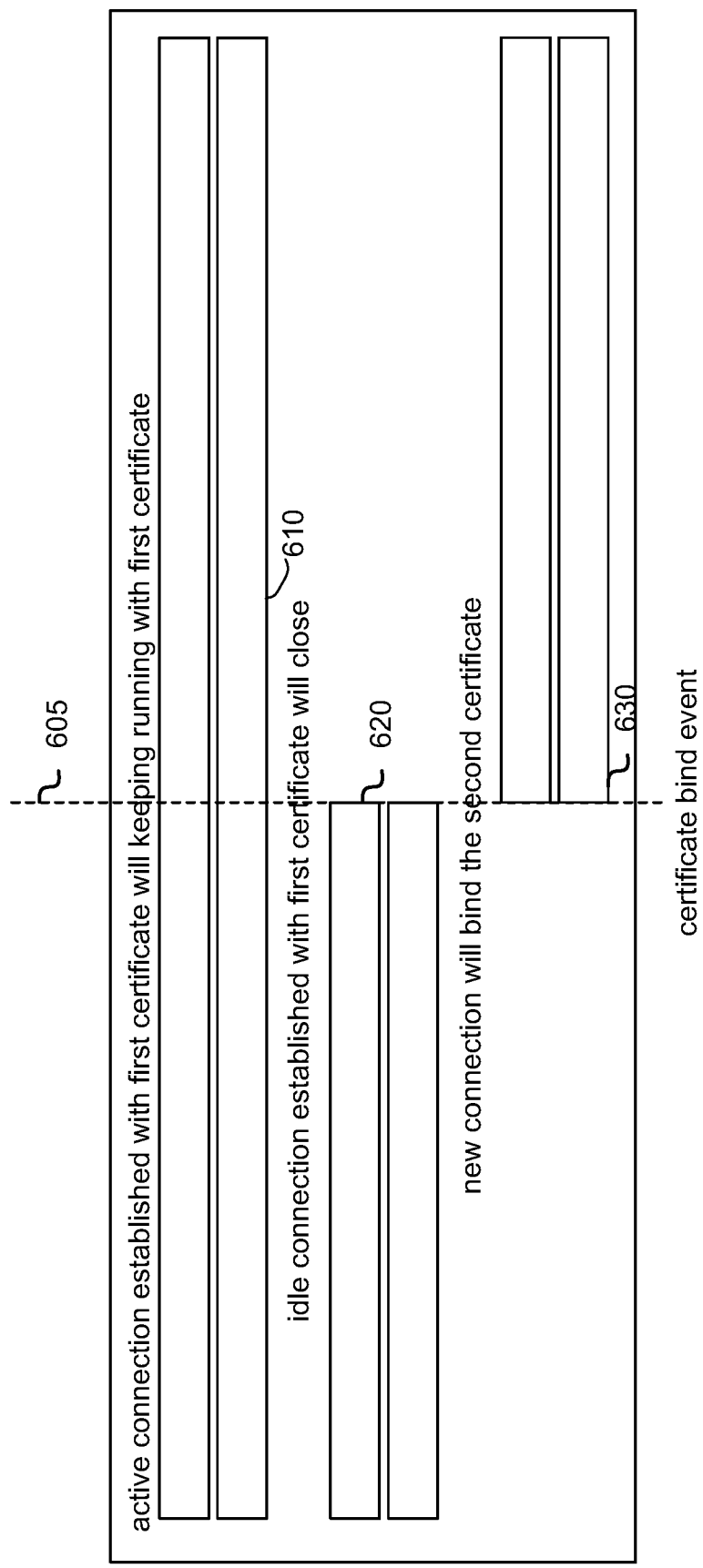
FIG. 6. shows an illustrative example of a gradual certificate rotation for an application server implementation in accordance with one or more example embodiments in the present disclosure.

FIG. 6 shows a diagram illustrating a certificate rotation process that may be used to rotate an application server from a first certificate to a second certificate. In some embodiments, certificate rotation on an application server from a first certificate to a second certificate may be implemented gradually. For example, a second certificate may be gradually transitioned into service at application server or a first certificate may be gradually transitioned out of service at application server. In some embodiments, a certificate rotation process may include an application server implementing a certificate bind event at time 605 to bind the second certificate to application server. The bind event may include initiating binding of the second certificate to the application server or initiating a transition from using the first certificate by the application server.

In some embodiments, on or after time 605, application server may service connections established by a first certificate. For example, a first connection 610 between application server and at least a first client may have been established with the first certificate prior to time 605. In some embodiments, first connection 610 may be determined to be active at time 605. A connection may be determined to be active, for example, if an amount of data associated with the connection (e.g., sent or received data rate) exceeds a threshold. As a result of a determination that first connection 610 is active on or after time 605, first connection 610 may be allowed to continue after time 605. For example, data may transferred via the first connection after time 605. In some embodiments, after time 605, first connection 610 may be determined to have transitioned from active to inactive, and first connection 610 may then be ended (e.g., closed). In some embodiments, first connection 610 may be ended after a defined amount of time has elapsed since time 605 of the certificate bind event. In some embodiments, first connection 610 may be ended after time 605 at a defined amount of time prior to an expiration of the first certificate. For example, if the first certificate is determined to have an expiration of 12:00 on Dec. 21, 2019, the first connection 610 may be ended a defined amount of time (e.g., 1 day, 12 hours, 30 minutes, etc.) prior to the expiration. In some embodiments, if the first connection 610 is closed after time 605, communication between the application server and at least the first client may be established using the second certificate.

As depicted in FIG. 6, a second connection 620 between the application server and at least a second client may have been established using the first certificate. Second connection 620 may be determined to be inactive on or after time 605. In some embodiments, second connection 620 may then be ended as a result of a determination that second connection is inactive on or after time 605. In some embodiments, a third connection 630 may be established on or after time 605 between the application server and at least a third client using the second certificate. In some embodiments, establishing the third connection 630 may bind the second certificate to the application server. It is understood that two certificates may simultaneously be bound to the application server thereby allowing a gradual transition by the application server from the certificate being replaced to a new certificate in a manner that may avoid disrupting active connections established by the certificate that is to be replaced. For example, first connection 610 and third connection 630 may be simultaneously serviced by the application server during an overlapping period of time. Although first, second, and third connections 610, 620, and 630 may involve communications with a single client, it will be appreciated that one or more of first, second, and third connections 610, 620, and 630 may be between the application server and a plurality of clients.

Active or inactive connections may be determined based on an amount of data that has been communicated between the application server and one or more clients over a time period. For example, a threshold amount of data for an amount of time may be established and connections that are determined to exceed the threshold amount of data for the amount of time may be categorized as active, and connections that do not meet or exceed the threshold may be categorized as inactive. In some embodiments, if the second connection 620 has ended after time 605, the second client may request to establish a connection with application server. In such embodiments, a new connection may be established using the second certificate. In some embodiments, an active session may be ended after a defined amount of time has elapsed since time 605. For example, first connection 610 may be ended, even if active, a defined amount of time (e.g., 50 minutes, 24 hours, or 3 days) after the time 605. In some embodiments, a connection established using the first certificate that is active after the time 605 may be ended if the first certificate will likely expire within a defined time period (e.g., 12 hours, 2 days, etc.) or has already expired. When a majority or all connections established with the first certificate have been ended after the time 605, rotation to the second certificate may be categorized as being complete.

In some embodiments, at a second time after time 605 a roll back from the second certificate to the first certificate may be initiated. For example, a roll back may be initiated as a result of a request to roll back that may submitted by a service owner. In another example, a roll back may be automatically initiated as a result of a potential problem being detected regarding an application server or a certificate that has been bound to the application server. For example, if a roll back from the second certificate to the first certificate is initiated, third connection 630 may be ended. In some embodiments, third connection 630 may be ended if the third connection 630 is determined to be inactive. In some embodiments, some or all connections established with the second certificate may be ended on or after the second time regardless of whether such connections are active or inactive. For example, if a problem with the second certificate is determined, it may be desirable to end all connections established with the second certificate at a time of the roll back. In some embodiments, new connections established after the second time may be established using the first certificate. In some embodiments where a rollback from a second certificate to the first certificate has been initiated, a connection established after the second time using the first certificate may continue to be in use even if the connections is inactive. In some embodiments, a rollback on an application server from a second certificate to a first certificate may be determined to be complete if a defined amount of connections established between the application server and clients using the second certificate have ended and one or more connections that were established using the first certificate are active.

Figure 7:
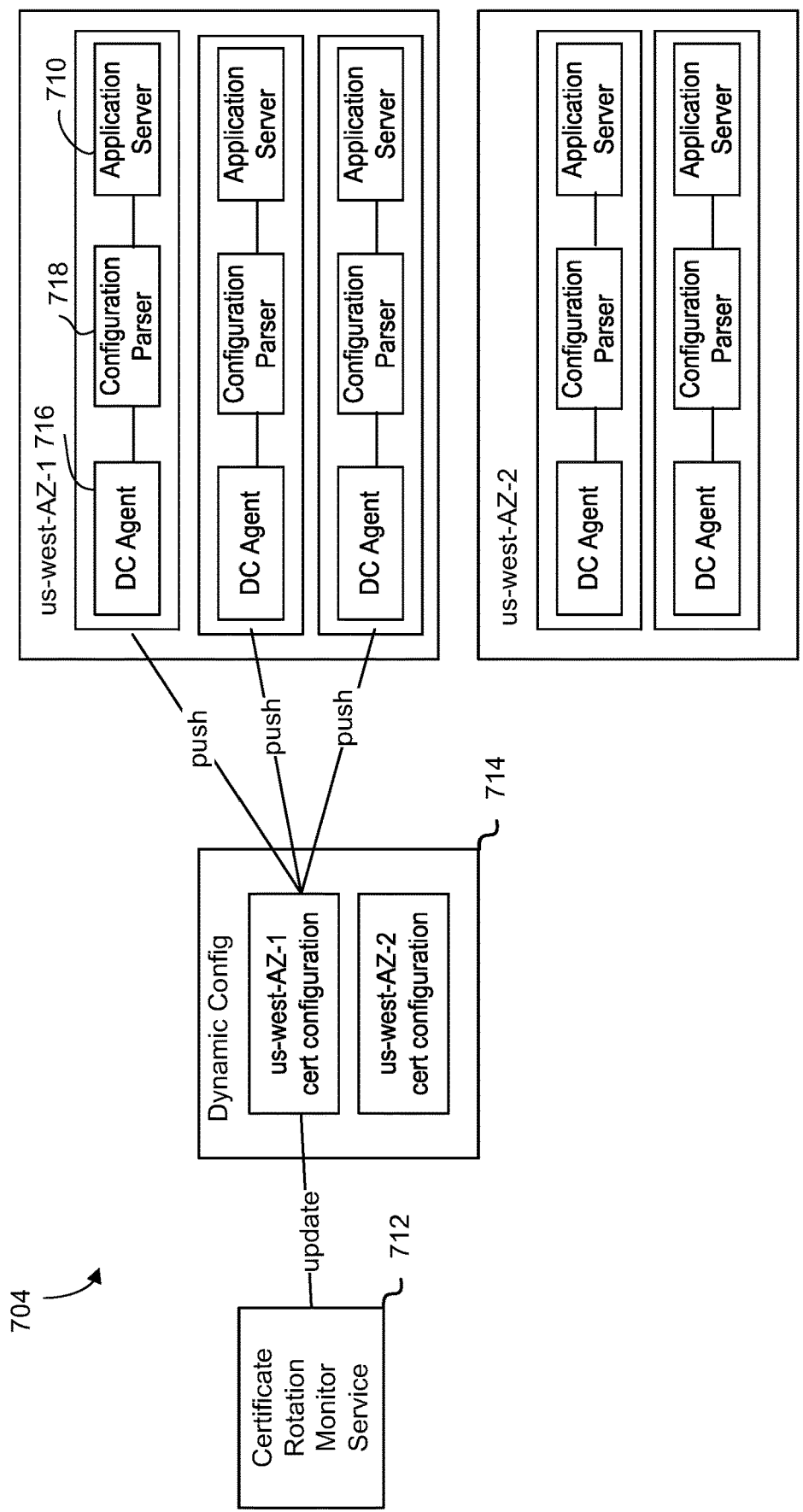
FIG. 7. shows an illustrative example illustrating an update from a certificate rotation monitor being implemented across application servers in accordance with one or more embodiments.

FIG. 7 depicts an example of a portion of an environment 704 that may perform a certificate rotation. A certificate rotation monitor 712 may provide (e.g., push) an update of a certificate to dynamic configuration service 714. The update may be derived from a certificate rotation event detected by the certificate rotation monitor 712. In some embodiments, the certificate rotation monitor 712 may obtain a certificate rotation event by subscribing to certificate rotation events for particular certificates. The update may indicate a new certificate that is to replace a certificate or a certificate that is to be replaced by a new certificate. In some embodiments, dynamic configuration service 714 may determine certificate configuration information based on the update. Dynamic configuration service 714 may determine network addresses of hosts having application servers 710 to which the certificate has been bound. In some embodiments, the addresses of the hosts correspond to addresses of dynamic configuration agents 716 or other services, agents, or daemons that may be running on the hosts. For example, dynamic configuration service 714 may push certificate configuration information to the dynamic configuration agents 716. In some embodiments, dynamic configuration agents 716 may provide certificate configuration information to configuration parser 718 to obtain a certificate identifier for the new certificate. In some embodiments, certificate information for the new certificate may be obtained using the certificate identifier. For example, certificate information for the new certificate may be obtained from a distribution service as a result of the certificate identifier being submitted to the distribution service. The certificate information for the new certificate may then be provided to the application server 710, and the application server 710 may bind the new certificate, for example, by using a private key of the new certificate to establish a connection with a client.

Figure 8:
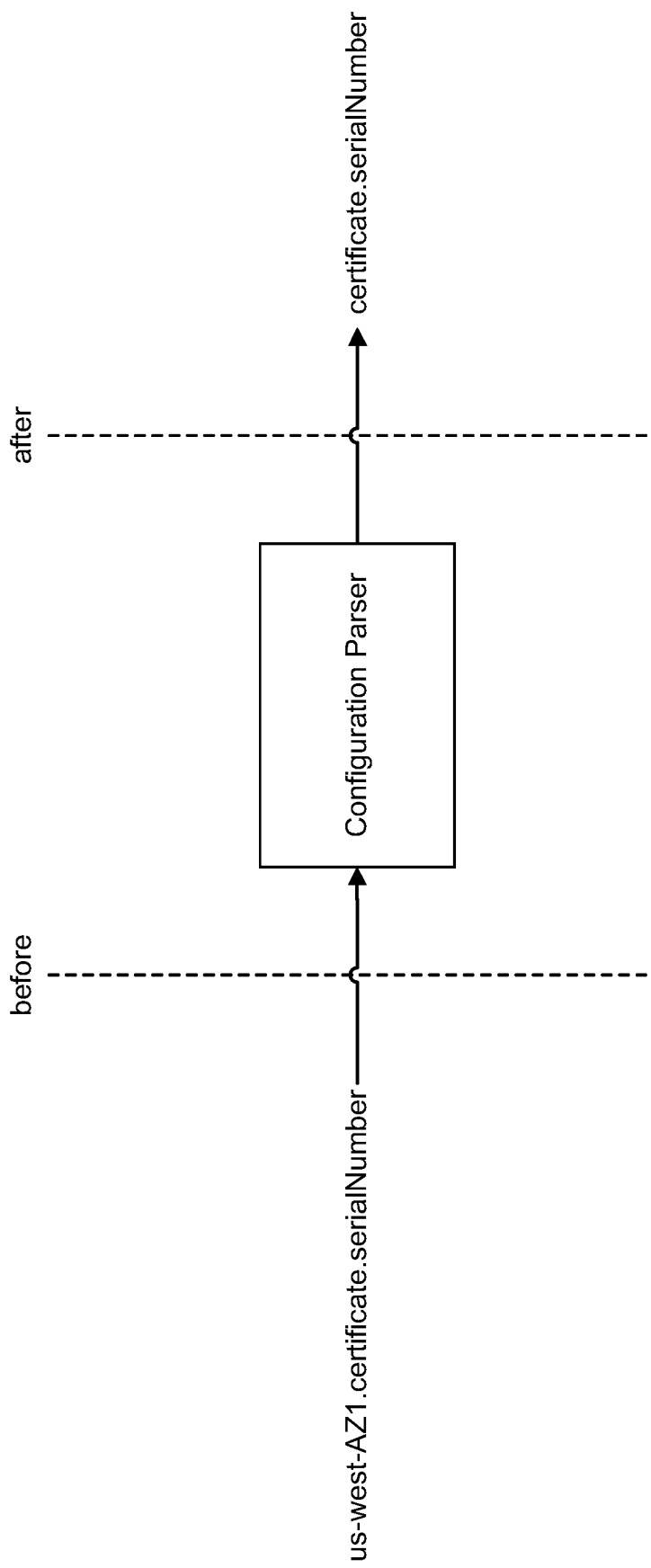
FIG. 8. shows an illustrative example of a configuration parser that parses a zone specific configuration to a common configuration in accordance with one or more embodiments.

FIG. 8 depicts an implementation where information indicating geographic zones may be added (e.g., us-west-AZ-1.certificate.serialNumber) or removed. In some embodiments, a configuration parser may be connected to or incorporated as part of a dynamic configuration agent. In an embodiment, a dynamic configuration service may cause application servers running on hosts in a same zone to bind a new certificate indicated in certificate configuration information provided by the dynamic configuration service. In such embodiments, a configuration parser may read the information from the dynamic configuration agent and remove the zone namespace to allow application servers to get consistent certificate configuration information. In some embodiments, a central certificate rotation monitor service may schedule deployments for each zone, for example a single zone at a defined time with defined intervals between deployments.

Figure 9:
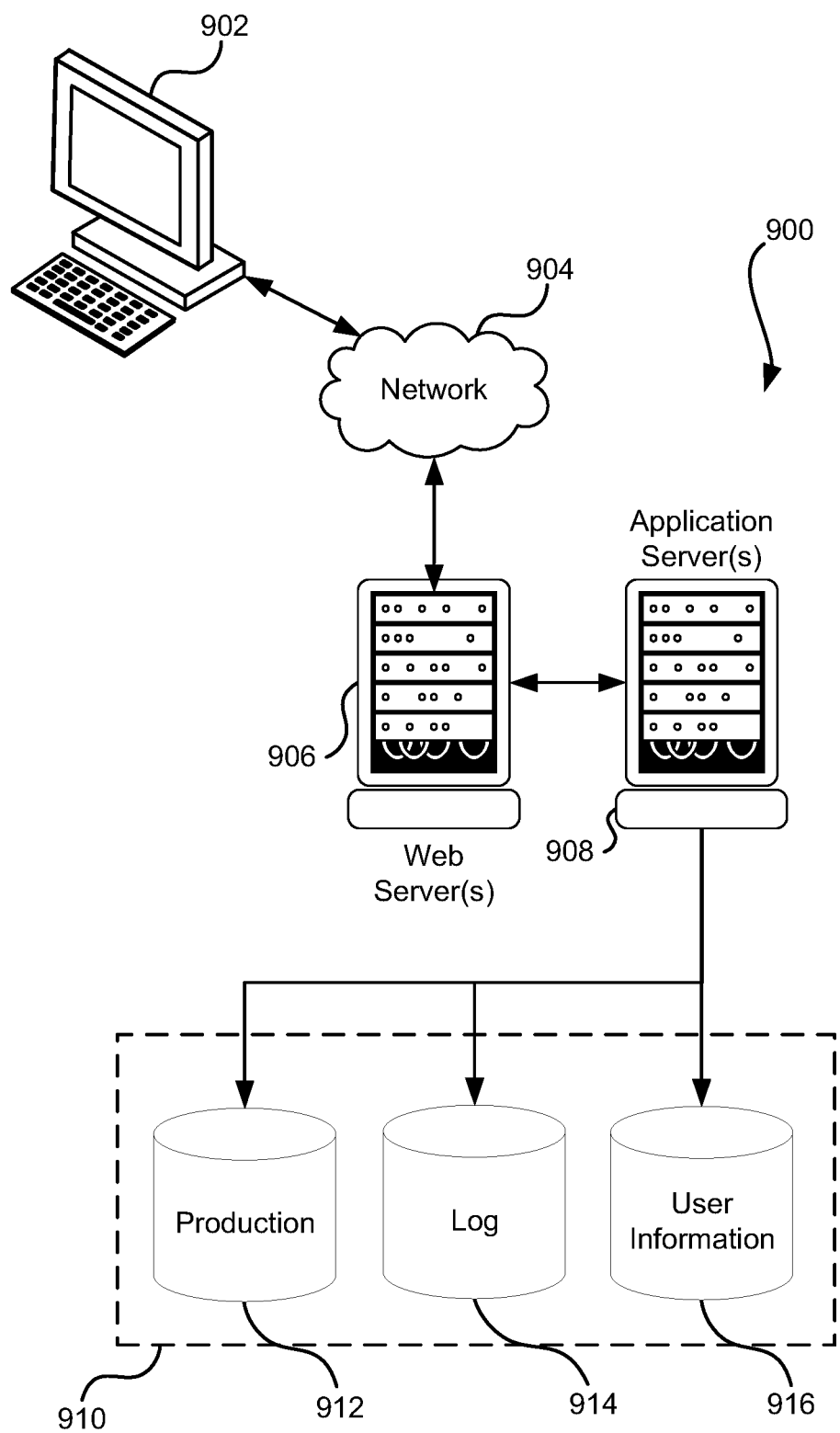
FIG. 9. shows an example certificate rotation process of a certificate rotation environment in accordance with one or more example embodiments.

Now referring to FIG. 9, which depicts an example process flow 900 for an automatic certificate rotation process. Process flow may be performed, for example, using environment 200. At block 902, the process may begin. At block 904, a notification to rotate a certificate to a new certificate may be detected. In some embodiments, the notification may be a certificate rotation event output by a certificate management tool. A notification of a certificate rotation event may be detected, for example, by a certificate rotation monitor receiving a push notification that is indicative of a certificate rotation event. In some embodiments, an update may be provided as a result of a notification of a certificate rotation event being detected. For example, a certificate rotation monitor may output an update that may be indicative of the certificate rotation event to a dynamic configuration service. At block 906, one or more network addresses may be obtained, for example, of agents running on hosts on which application servers associated with the certificate may be running. For example, the application servers may be associated with the certificate if the certificate is bound to the application server. In some embodiments, such addresses may be stored in a storage service that may be accessible by a dynamic configuration service. In some embodiments, a dynamic configuration service may provide certificate configuration information to agents running on hosts associated with the certificate that is to be replaced with the new certificate. In some embodiments, agents running on hosts may obtain a certificate identifier for the new certificate from the certificate configuration information. At block 908, a new certificate may be obtained. In some embodiments, the new certificate may be obtained from a distribution service. For example, a certificate identifier for the new certificate may be provided to a service, such as a distribution service, and the distribution service may return certificate information (e.g., private key, certificate serial number, expiration date, etc.) for the new certificate. At block 910 the new certificate may be provided to a host. At block 912, an application server running on the host may bind the new certificate. In some embodiments, the application server may bind the new certificate by establishing a connection with one or more clients using the new certificate. In some embodiments, the new certificate may gradually replace the certificate, for example, as described in connection with FIG. 6. At block 914, the process may end when certificate rotation has been completed. For example, process 900 may end after connections between the application server and one or more clients that were established with the certificate have ended or one or more connections have been established between the application server and one or more clients using the new certificate. In some embodiments, process 900 may be automatically initiated at block 902 when a certificate rotation event is detected by a certificate rotation monitor.

Figure 10:
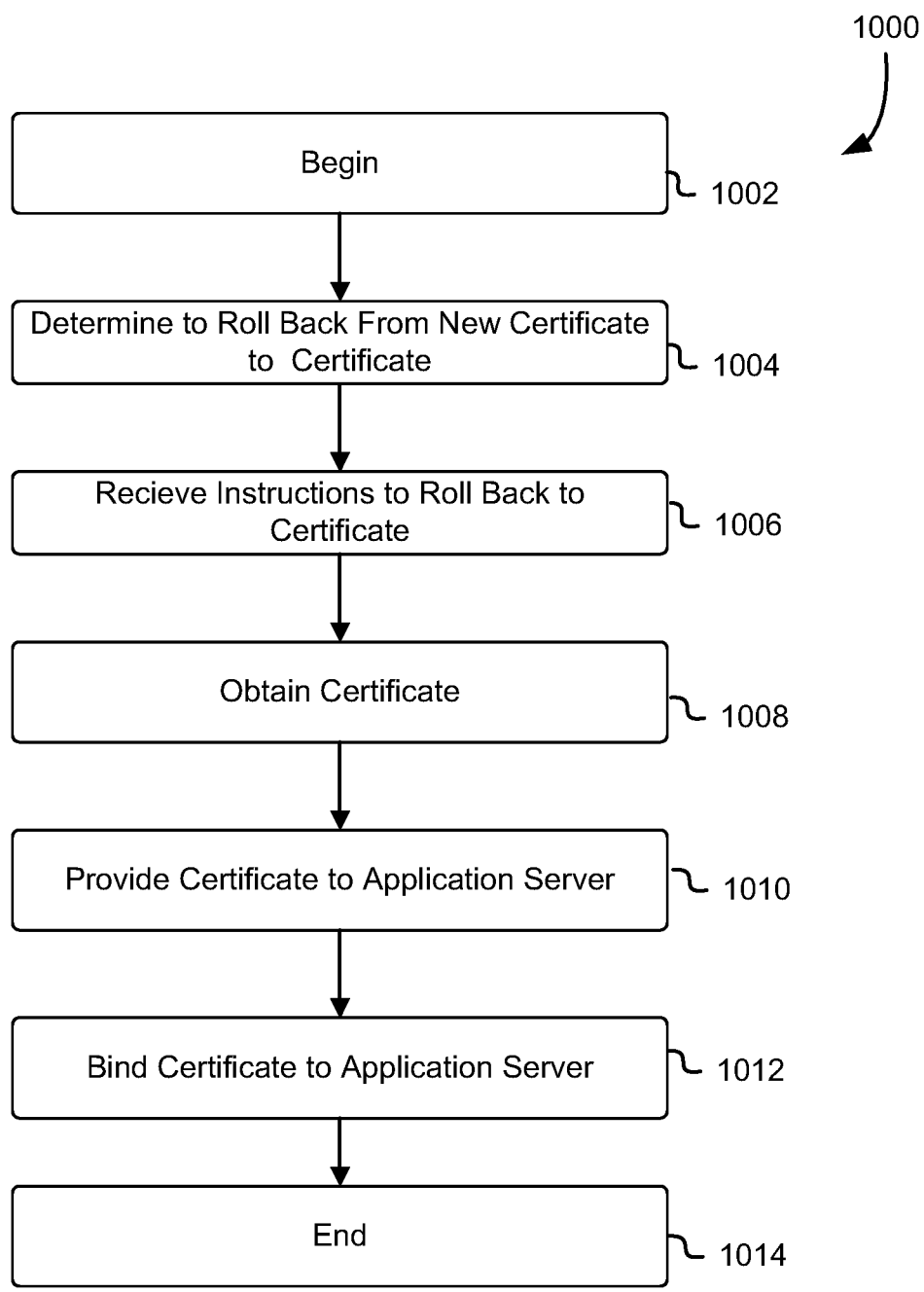
FIG. 10 shows an example certificate roll back process of a certificate rotation environment in accordance with one or more example embodiments.

Now referring to FIG. 10, which depicts an example process flow 1000 for a roll back process that may be used to transition an application server from a new certificate to a certificate. Process flow 1000 may be performed using environment 200, for example. At block 1002, the process may begin. At block 1004, a determination may be made to roll back an application server, for example, from a new certificate to a certificate. In some embodiments, the certificate may be determined by a service owner. In some embodiments, the certificate may be determined automatically. In some embodiments, the certificate may have been previously bound to the application server. For example, the certificate may be a certificate that was bound to the application server prior to the application server binding the new certificate. In some embodiments, a previously bound certificate may currently be bound to the application server at a time that a roll back is initiated. For example, at a roll back time, the application server may be servicing connections that were established using the certificate. In some embodiments, if a roll back is initiated for a partially completed certificate rotation, such as discussed in connection with FIG. 6, the certificate may have been used to establish active connections before a bind time when the application server binds a new certificate. After a bind time, the application server may service connections established using the certificate and the new certificate. In some embodiments, a determination to initiate a roll back may be based on a notification of a potential problem with the new certificate or the application server being output, for example, by an analytics service. In some embodiments, a certificate rotation monitor may determine to roll back based on whether a rotation from a certificate to a new certificate has been completed or is partially completed on an application server. For example, if a certificate rotation from a certificate to a new certificate has been partially completed and a potential problem is detected, for example, with application server, a roll back may be automatically initiated to transition the application server from the new certificate to the certificate. In another example, if a certificate rotation from a certificate to a new certificate has been completed, a notification may be sent to a service owner for approval prior to a roll back being initiated. In such an example, a roll back may be initiated after a service owner has provided an approval.

At block 1006, instructions to roll back to a previous certificate may be received, for example, by an agent of a host certificate management service from a certificate rotation monitor or a dynamic configuration service. At block 1008, a certificate that is to replace the new certificate in the roll back may be obtained, for example, from a distribution service or a certificate management tool. In some embodiments where certificate rotation is partially completed, a certificate and a new certificate may be bound to the application server. In such embodiments, the certificate that is to replace the new certificate in the roll back may be accessible to the application server. For example, certificate information for the certificate may be stored in memory or storage of the application server. At block 1010, the certificate may be provided to the application server with instructions for the application server to bind the certificate. In some embodiments, a host certificate management service may convert the certificate to a certificate format type that is compatible with the application server and provide a compatible certificate to the application server.

At block 1012, application server may bind the certificate. In some embodiments, binding may be accomplished, at least in part, by using the certificate to establish a connection between the application server and a client. In some embodiments, a gradual binding process may be used to rotate to the certificate from the new certificate. In some embodiments where a roll back is initiated before deployment to a new certificate has been completed, the certificate may be bound to the application server at a time of a roll back. For example, at a time of a roll back, application server may be servicing a connection that was established using the certificate. In such embodiments, after a time of a roll back, one or more connections established with a new certificate may be ended and new connections may be established using the certificate. At block 1014, the process may end. In some embodiments, the process may end after the application server binds the certificate and a majority, or all, connections currently serviced by the application server have been established using the certificate.

Figure 11:
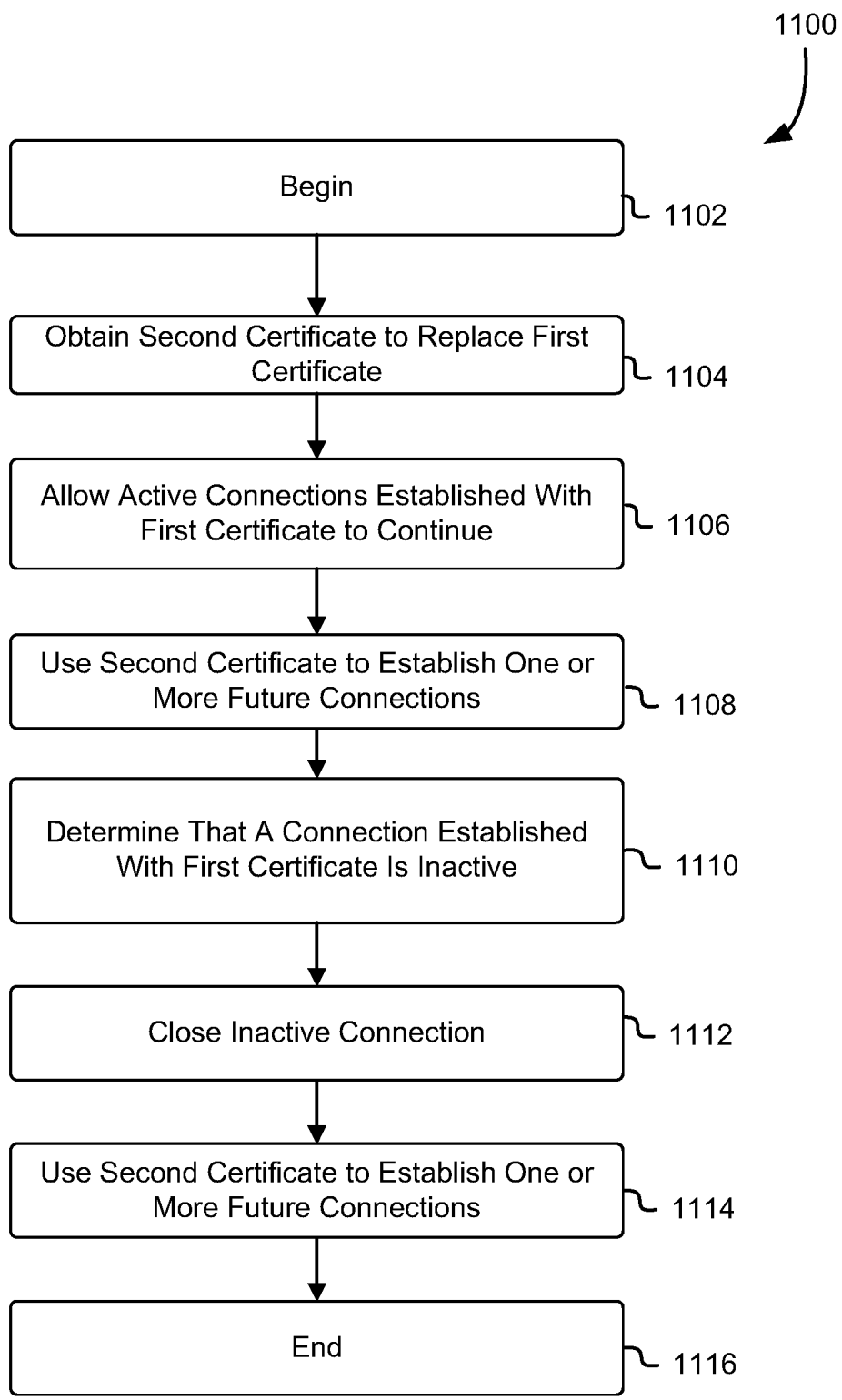
FIG. 11. shows an example gradual rotation process for an application server of a host in accordance with one or more example embodiments.

Now referring to FIG. 11, which depicts an example process flow 1100 for an embodiment of a gradual certificate rotation process, is presented. Process flow may be performed using the environment 200, for example. At block 1102 the process may begin. At block 1104, a second certificate that is to replace a first certificate at an application server of a host may be obtained. For example, the second certificate may be obtained from a distribution service as a result of certificate configuration information being provided to a host on which an application server associated with the first certificate may be running. The application server may be associated with the first certificate, for example, by the first certificate being bound to the application server. At block 1106, after the application server initiates binding of the second certificate, active connections established between the application server and clients using the first certificate may be allowed to remain in use. At block 1108, future connections between the application server and one or more clients may be established using the second certificate. In some embodiments, the connections established using the first certificate may be allowed to remain in use after the connections have been established using the second certificate. Gradually ending connections established with first certificate and establishing new connections with second certificate may cause fewer service disruptions compared to ending active connections established with the first certificate when the application server initiates binding to the second certificate. At block 1110, one or more inactive connections established by the first certificate between the application server and clients may be determined. For example, the one or more inactive or active connections may be determined based at least in part on an amount of data communicated via the connection for an amount of time. At block 1112, at least some of the one or more inactive connection may be closed. At block 1114, one or more future connections may be established between the application server and one or more clients using the second certificate. In some embodiments, the connections may be established after the one or more inactive connection has been closed. For example, subsequent to an inactive connection between the application server and a client being closed, a connection may be established between the application server and the client using the second certificate. At block 1116, the process may end. In some embodiments, the process may end when connections established with the first certificate have ended and new connections have been established with the second certificate. For example, the process may end when all connections established using the first certificate have been ended.

Figure 12:
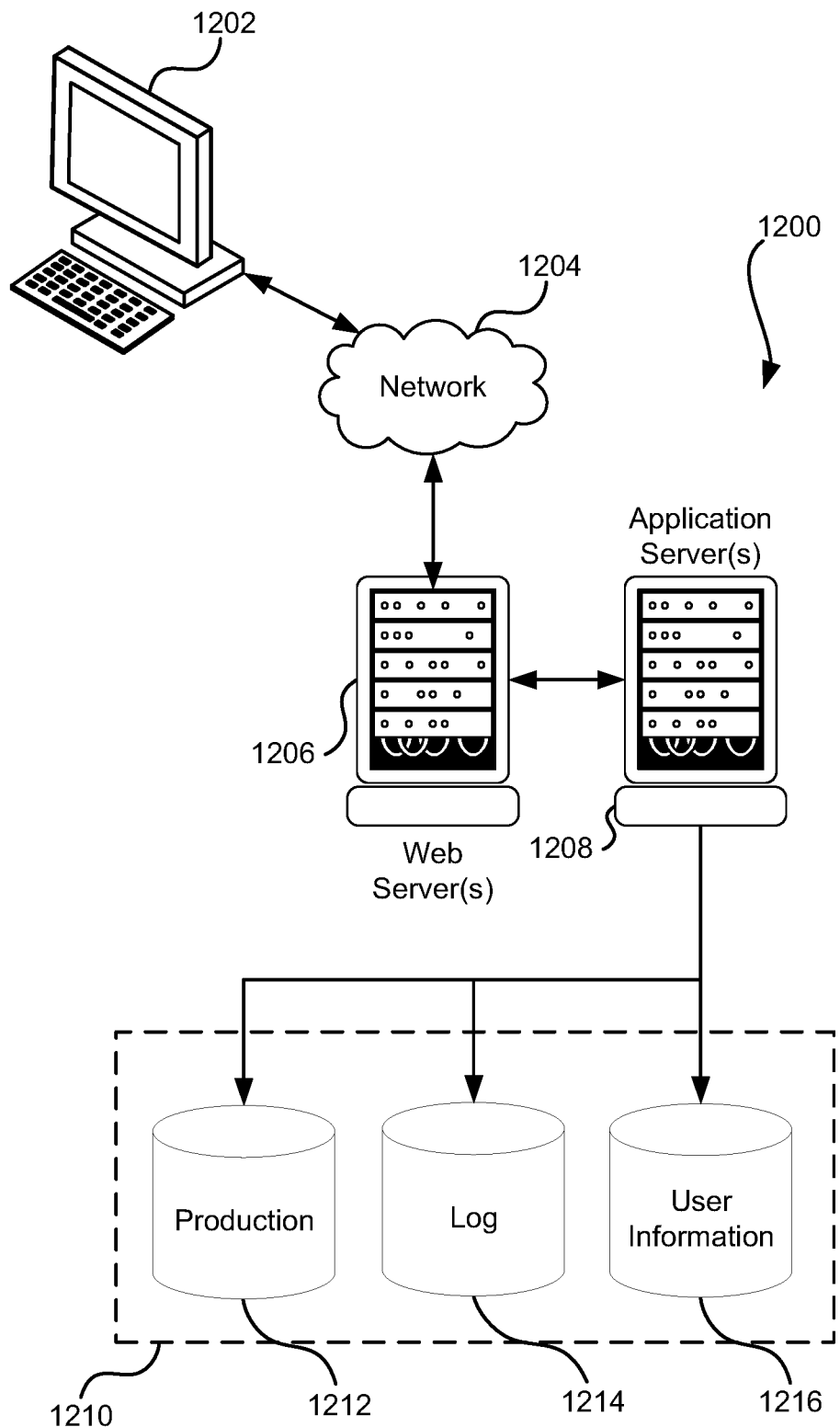
FIG. 12 illustrates a system in which various embodiments can be implemented.

FIG. 12 illustrates aspects of an example system 1200 for implementing aspects in accordance with one or more embodiments. As will be appreciated, although a web-based system is used for purposes of explanation, different systems may be used, as appropriate, to implement various embodiments. In an embodiment, the system includes an electronic client device 1202, which includes any appropriate device operable to send and/or receive requests, messages, or information over an appropriate network 1204 and convey information back to a user of the device. Examples of such client devices include personal computers, cellular or other mobile phones, handheld messaging devices, laptop computers, tablet computers, set-top boxes, personal data assistants, embedded computer systems, electronic book readers, and the like. In an embodiment, the network includes any appropriate network, including an intranet, the Internet, a cellular network, a local area network, a satellite network or any other such network and/or combination thereof, and components used for such a system depend at least in part upon the type of network and/or system selected. Many protocols and components for communicating via such a network are well known and will not be discussed herein in detail. In an embodiment, communication over the network is enabled by wired and/or wireless connections and combinations thereof. In an embodiment, the network includes the Internet and/or other publicly addressable communications network, as the system includes a web server 1206 for receiving requests and serving content in response thereto, although for other networks an alternative device serving a similar purpose could be used as would be apparent to one of ordinary skill in the art.

In an embodiment, the illustrative system includes at least one application server 1208 and a data store 1210, and it should be understood that there can be several application servers, layers or other elements, processes or components, which may be chained or otherwise configured, which can interact to perform tasks such as obtaining data from an appropriate data store. Servers, in an embodiment, are implemented as hardware devices, virtual computer systems, programming modules being executed on a computer system, and/or other devices configured with hardware and/or software to receive and respond to communications (e.g., web service application programming interface (API) requests) over a network. As used herein, unless otherwise stated or clear from context, the term "data store" refers to any device or combination of devices capable of storing, accessing and retrieving data, which may include any combination and number of data servers, databases, data storage devices and data storage media, in any standard, distributed, virtual or clustered system. Data stores, in an embodiment, communicate with block-level and/or object-level interfaces. The application server can include any appropriate hardware, software and firmware for integrating with the data store as needed to execute aspects of one or more applications for the client device, handling some or all of the data access and business logic for an application.

In an embodiment, the application server provides access control services in cooperation with the data store and generates content including but not limited to text, graphics, audio, video and/or other content that is provided to a user associated with the client device by the web server in the form of HyperText Markup Language ("HTML"), Extensible Markup Language ("XML"), JavaScript, Cascading Style Sheets ("CSS"), JavaScript Object Notation (JSON), and/or another appropriate client-side or other structured language. Content transferred to a client device, in an embodiment, is processed by the client device to provide the content in one or more forms including but not limited to forms that are perceptible to the user audibly, visually and/or through other senses. The handling of all requests and responses, as well as the delivery of content between the client device 1202 and the application server 1208, in an embodiment, is handled by the web server using PHP: Hypertext Preprocessor ("PHP"), Python, Ruby, Perl, Java, HTML, XML, JSON, and/or another appropriate server-side structured language in this example. In an embodiment, operations described herein as being performed by a single device are performed collectively by multiple devices that form a distributed and/or virtual system.

The data store 1210, in an embodiment, includes several separate data tables, databases, data documents, dynamic data storage schemes and/or other data storage mechanisms and media for storing data relating to a particular aspect of the present disclosure. In an embodiment, the data store illustrated includes mechanisms for storing production data 1212 and user information 1216, which are used to serve content for the production side. The data store also is shown to include a mechanism for storing log data 1214, which is used, in an embodiment, for reporting, computing resource management, analysis or other such purposes. In an embodiment, other aspects such as page image information and access rights information (e.g., access control policies or other encodings of permissions) are stored in the data store in any of the above listed mechanisms as appropriate or in additional mechanisms in the data store 1210.

The data store 1210, in an embodiment, is operable, through logic associated therewith, to receive instructions from the application server 1208 and obtain, update or otherwise process data in response thereto, and the application server 1208 provides static, dynamic, or a combination of static and dynamic data in response to the received instructions. In an embodiment, dynamic data, such as data used in web logs (blogs), shopping applications, news services, and other such applications, are generated by server-side structured languages as described herein or are provided by a content management system ("CMS") operating on or under the control of the application server. In an embodiment, a user, through a device operated by the user, submits a search request for a certain type of item. In this example, the data store accesses the user information to verify the identity of the user, accesses the catalog detail information to obtain information about items of that type, and returns the information to the user, such as in a results listing on a web page that the user views via a browser on the user device 1202. Continuing with this example, information for a particular item of interest is viewed in a dedicated page or window of the browser. It should be noted, however, that embodiments of the present disclosure are not necessarily limited to the context of web pages, but are more generally applicable to processing requests in general, where the requests are not necessarily requests for content. Example requests include requests to manage and/or interact with computing resources hosted by the system 1200 and/or another system, such as for launching, terminating, deleting, modifying, reading, and/or otherwise accessing such computing resources.

In an embodiment, each server typically includes an operating system that provides executable program instructions for the general administration and operation of that server and includes a computer-readable storage medium (e.g., a hard disk, random access memory, read only memory, etc.) storing instructions that, if executed by a processor of the server, cause or otherwise allow the server to perform its intended functions (e.g., the functions are performed as a result of one or more processors of the server executing instructions stored on a computer-readable storage medium).

The system 1200, in an embodiment, is a distributed and/or virtual computing system utilizing several computer systems and components that are interconnected via communication links (e.g., transmission control protocol (TCP) connections and/or transport layer security (TLS) or other cryptographically protected communication connections), using one or more computer networks or direct connections. However, it will be appreciated by those of ordinary skill in the art that such a system could operate in a system having fewer or a greater number of components than are illustrated in FIG. 12. Thus, the depiction of the system 1200 in FIG. 12 should be taken as being illustrative in nature and not limiting to the scope of the disclosure.

The various embodiments further can be implemented in a wide variety of operating environments, which in some cases can include one or more user computers, computing devices or processing devices that can be used to operate any of a number of applications. In an embodiment, user or client devices include any of a number of computers, such as desktop, laptop or tablet computers running a standard operating system, as well as cellular (mobile), wireless and handheld devices running mobile software and capable of supporting a number of networking and messaging protocols, and such a system also includes a number of workstations running any of a variety of commercially available operating systems and other known applications for purposes such as development and database management. In an embodiment, these devices also include other electronic devices, such as dummy terminals, thin-clients, gaming systems and other devices capable of communicating via a network, and virtual devices such as virtual machines, hypervisors, software containers utilizing operating-system level virtualization and other virtual devices or non-virtual devices supporting virtualization capable of communicating via a network.

In an embodiment, a system utilizes at least one network that would be familiar to those skilled in the art for supporting communications using any of a variety of commercially available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS") and other protocols. The network, in an embodiment, is a local area network, a wide-area network, a virtual private network, the Internet, an intranet, an extranet, a public switched telephone network, an infrared network, a wireless network, a satellite network, and any combination thereof. In an embodiment, a connection-oriented protocol is used to communicate between network endpoints such that the connection-oriented protocol (sometimes called a connection-based protocol) is capable of transmitting data in an ordered stream. In an embodiment, a connection-oriented protocol can be reliable or unreliable. For example, the TCP protocol is a reliable connection-oriented protocol. Asynchronous Transfer Mode ("ATM") and Frame Relay are unreliable connection-oriented protocols. Connection-oriented protocols are in contrast to packet-oriented protocols such as UDP that transmit packets without a guaranteed ordering.

In an embodiment, the system utilizes a web server that runs one or more of a variety of server or mid-tier applications, including Hypertext Transfer Protocol ("HTTP") servers, FTP servers, Common Gateway Interface ("CGI") servers, data servers, Java servers, Apache servers, and business application servers. In an embodiment, the one or more servers are also capable of executing programs or scripts in response to requests from user devices, such as by executing one or more web applications that are implemented as one or more scripts or programs written in any programming language, such as Java®, C, C# or C++, or any scripting language, such as Ruby, PHP, Perl, Python or TCL, as well as combinations thereof. In an embodiment, the one or more servers also include database servers, including without limitation those commercially available from Oracle®, Microsoft®, Sybase®, and IBM® as well as open-source servers such as MySQL, Postgres, SQLite, MongoDB, and any other server capable of storing, retrieving, and accessing structured or unstructured data. In an embodiment, a database server includes table-based servers, document-based servers, unstructured servers, relational servers, non-relational servers, or combinations of these and/or other database servers.

In an embodiment, the system includes a variety of data stores and other memory and storage media as discussed above that can reside in a variety of locations, such as on a storage medium local to (and/or resident in) one or more of the computers or remote from any or all of the computers across the network. In an embodiment, the information resides in a storage-area network ("SAN") familiar to those skilled in the art and, similarly, any necessary files for performing the functions attributed to the computers, servers or other network devices are stored locally and/or remotely, as appropriate. In an embodiment where a system includes computerized devices, each such device can include hardware elements that are electrically coupled via a bus, the elements including, for example, at least one central processing unit ("CPU" or "processor"), at least one input device (e.g., a mouse, keyboard, controller, touch screen, or keypad), at least one output device (e.g., a display device, printer, or speaker), at least one storage device such as disk drives, optical storage devices, and solid-state storage devices such as random access memory ("RAM") or read-only memory ("ROM"), as well as removable media devices, memory cards, flash cards, etc., and various combinations thereof.

In an embodiment, such a device also includes a computer-readable storage media reader, a communications device (e.g., a modem, a network card (wireless or wired), an infrared communication device, etc.), and working memory as described above where the computer-readable storage media reader is connected with, or configured to receive, a computer-readable storage medium, representing remote, local, fixed, and/or removable storage devices as well as storage media for temporarily and/or more permanently containing, storing, transmitting, and retrieving computer-readable information. In an embodiment, the system and various devices also typically include a number of software applications, modules, services, or other elements located within at least one working memory device, including an operating system and application programs, such as a client application or web browser. In an embodiment, customized hardware is used and/or particular elements are implemented in hardware, software (including portable software, such as applets), or both. In an embodiment, connections to other computing devices such as network input/output devices are employed.

In an embodiment, storage media and computer readable media for containing code, or portions of code, include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood. however, that there is no intention to limit the invention to the specific form or forms disclosed but, on the contrary, the intention is to cover all modifications, alternative constructions, and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. Similarly, use of the term "or" is to be construed to mean "and/or" unless contradicted explicitly or by context. The terms "comprising," "having," "including," and "containing" are to be construed as open-ended terms (i.e., meaning "including, but not limited to,") unless otherwise noted. The term "connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal. The use of the phrase "based on," unless otherwise explicitly stated or clear from context, means "based at least in part on" and is not limited to "based solely on."

Conjunctive language, such as phrases of the form "at least one of A, B, and C," or "at least one of A, B and C," (i.e., the same phrase with or without the Oxford comma) unless specifically stated otherwise or otherwise clearly contradicted by context, is otherwise understood within the context as used in general to present that an item, term, etc., may be either A or B or C, any nonempty subset of the set of A and B and C, or any set not contradicted by context or otherwise excluded that contains at least one A, at least one B, or at least one C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}, and, if not contradicted explicitly or by context, any set having {A}, {B}, and/or {C} as a subset (e.g., sets with multiple "A"). Thus, such conjunctive language is not generally intended to imply that certain embodiments require at least one of A, at least one of B and at least one of C each to be present. Similarly, phrases such as "at least one of A, B, or C" and "at least one of A, B or C" refer to the same as "at least one of A, B, and C" and "at least one of A, B and C" refer to any of the following sets: {A}, {B}, {C}, {A, B}, {A, C}, {B, C}, {A, B, C}, unless differing meaning is explicitly stated or clear from context. In addition, unless otherwise noted or contradicted by context, the term "plurality" indicates a state of being plural (e.g., "a plurality of items" indicates multiple items). The number of items in a plurality is at least two but can be more when so indicated either explicitly or by context.

Operations of processes described herein can be performed in any suitable order unless otherwise indicated herein or otherwise clearly contradicted by context. In an embodiment, a process such as those processes described herein (or variations and/or combinations thereof) is performed under the control of one or more computer systems configured with executable instructions and is implemented as code (e.g., executable instructions, one or more computer programs or one or more applications) executing collectively on one or more processors, by hardware or combinations thereof. In an embodiment, the code is stored on a computer-readable storage medium, for example, in the form of a computer program comprising a plurality of instructions executable by one or more processors. In an embodiment, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In an embodiment, code (e.g., executable code or source code) is stored on a set of one or more non-transitory computer-readable storage media having stored thereon executable instructions that, when executed (i.e., as a result of being executed) by one or more processors of a computer system, cause the computer system to perform operations described herein. The set of non-transitory computer-readable storage media, in an embodiment, comprises multiple non-transitory computer-readable storage media, and one or more of individual non-transitory storage media of the multiple non-transitory computer-readable storage media lack all of the code while the multiple non-transitory computer-readable storage media collectively store all of the code. In an embodiment, the executable instructions are executed such that different instructions are executed by different processors—for example, in an embodiment, a non-transitory computer-readable storage medium stores instructions and a main CPU executes some of the instructions while a graphics processor unit executes other instructions. In another embodiment, different components of a computer system have separate processors and different processors execute different subsets of the instructions.

Accordingly, in an embodiment, computer systems are configured to implement one or more services that singly or collectively perform operations of processes described herein, and such computer systems are configured with applicable hardware and/or software that enable the performance of the operations. Further, a computer system, in an embodiment of the present disclosure, is a single device and, in another embodiment, is a distributed computer system comprising multiple devices that operate differently such that the distributed computer system performs the operations described herein and such that a single device does not perform all operations.

The use of any and all examples or exemplary language (e.g., "such as") provided herein is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate, and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references including publications, patent applications, and patents cited herein are hereby incorporated by reference to the same extent as if each reference were individually and specifically indicated to be incorporated by reference and were set forth in its entirety herein.

What is claimed is:

1. A computer-implemented method, comprising:
   receiving a certificate rotation event, wherein the certificate rotation event is associated with a current certificate and is indicative that the current certificate is to be updated with a new certificate;
   obtaining, at an agent running on a host, the new certificate;
   as a result of a first determination that a first connection established with the current certificate between the host and a first client is active, allowing the first connection to remain in use;
   as a result of a second determination that a second connection established with the current certificate between the host and a second client is inactive, close the second connection; and
   as a result of a request to establish a third connection between the host and a third client being received, establishing the third connection between the host and the third client using the new certificate, wherein the first connection continues using the current certificate subsequent to the third connection using the new certificate to communicate with the third client and the certificate rotation event being received, wherein establishing the third connection includes causing the new certificate to bind to an application server of the host.

2. The computer-implemented method of claim 1, wherein the second connection is closed subsequent to the third connection being established.

3. The computer-implemented method of claim 1, further comprising as a result of a third determination that the first connection has changed from active to inactive, ending the first connection.

4. A system, comprising:
   at least one computing device configured to implement one or more services, wherein the one or more services:
   receive a certificate rotation event, wherein the certificate rotation event is associated with a first certificate and is indicative that the first certificate is to be updated with a second certificate;
   obtain, at an agent running at a host, the second certificate;
   as a result of a first determination that a first connection established with the first certificate between the host and a first client is active, allow the first connection to remain in use;
   as a result of a second determination that a second connection established between the host and a second client with the first certificate is inactive, cause the second connection to close; and
   to as a result of a request to establish a third connection by the host and a third client being received, establish a third connection between the host and the third client using the second certificate, wherein the first connection continues using the first certificate subsequent to the third connection using the second certificate to communicate with the third client and the certificate rotation event being received, and wherein establishing the third connection includes causing the second certificate to bind to an application server of the host.

5. The system of claim 4, wherein the one or more services further:
   detect that the first connection established using the first certificate is inactive; and
   close the first connection.

6. The system of claim 5, wherein the one or more services further:
   subsequent to the first connection being closed, detect that a fourth connection established using the first certificate is inactive; and
   close the fourth connection.

7. The system of claim 4, wherein the first certificate and the second certificate are TLS certificates.

8. The system of claim 4, wherein:
   the second certificate is obtained as a result of the certificate rotation event being received; and
   the second certificate is obtained by the agent running on the host as a result of a certificate identifier of the second certificate being received at the host.

9. The system of claim 4, wherein a plurality of other connections established using the first certificate are allowed to remain in use as a result of a determination that the plurality of other connections established using the first certificate are active.

10. The system of claim 4, wherein:
- a plurality of other connections are established using the first certificate by the application server running on the host; and
- a fourth connection of the plurality of other connections involves communications between the application server and a fourth client.

11. The system of claim 4, wherein the certificate rotation event is a notification that is received at the host.

12. A set of non-transitory computer-readable storage media that stores executable instructions that, if executed by one or more processors of a computer system, cause the computer system to:
- receive a certificate rotation event, wherein the certificate rotation event is associated with a first certificate and is indicative that the first certificate is to be updated with a second certificate;
- obtain, at an agent running at a host, the second certificate;
- as a result of a first determination that a first connection established with the current certificate between a host and a first client is active, allow the first connection to remain in use;
- as a result of a second determination that a second connection established between the host and a second client with the first certificate is inactive, cause the second connection to close; and
- as a result of a request to establish a third connection by the host and a third client being received, establish a third connection between the host and a third client using the second certificate, wherein the first connection continues to use the first certificate subsequent to the third connection using the second certificate to communicate with the third client and the certificate rotation event being received, and wherein establishing the third connection includes causing the second certificate to bind to an application server of the host.

13. The set of non-transitory computer-readable storage media of claim 12, wherein the executable instructions further comprise instructions that, as a result of being executed by the one or more processors of the computer system, cause the computer system to establish, by the application server, a fourth connection while the first connection is in use by the application server.

14. The set of non-transitory computer-readable storage medium of claim 12, wherein the executable instructions further comprise instructions that, as a result of being executed by the one or more processors of the computer system, cause the computer system to:
- receive at the host the certificate rotation event, wherein the certificate rotation event is associated with the first certificate and indicates at least that the first certificate is to be updated by the second certificate; and
- obtain the second certificate as a result of a serial number of the second certificate being received by the agent.

15. The set of non-transitory computer-readable storage medium of claim 12, wherein the first connection and the second connection are established by a same application server.

16. The set of non-transitory computer-readable storage medium of claim 12, wherein the executable instructions further comprise instructions that, as a result of being executed by the one or more processors of the computer system, cause the computer system to:
- as a result of a determination that a status of the first connection has switched from active to inactive, close the first connection.

17. The set of non-transitory computer-readable storage medium of claim 12, wherein the executable instructions further comprise instructions that, as a result of being executed by the one or more processors of the computer system, cause the computer system to, subsequent to a determination that a problem has occurred with respect to binding the second certificate to the application server, establish future connections using the first certificate and end the third connection.

18. The set of non-transitory computer-readable storage medium of claim 12, wherein the second certificate is to replace the first certificate on the application server and the third connection is established while the first connection is active.

* * * * *